(12) United States Patent
Tuominen et al.

(10) Patent No.: US 11,840,359 B2
(45) Date of Patent: Dec. 12, 2023

(54) METHOD OF AND SYSTEM FOR PREPARING A PLURALITY OF ITEMS FOR AIR TRANSPORT

(71) Applicants: Juha Tuominen, Kirkkonummi (FI); Henric Nauckhoff, Esbo (FI)

(72) Inventors: Juha Tuominen, Kirkkonummi (FI); Henric Nauckhoff, Esbo (FI)

(\*) Notice: Subject to any disclaimer, the term of this patent is extended or adjusted under 35 U.S.C. 154(b) by 665 days.

(21) Appl. No.: 17/050,953

(22) PCT Filed: Apr. 26, 2019

(86) PCT No.: PCT/FI2019/050338
§ 371 (c)(1),
(2) Date: Oct. 27, 2020

(87) PCT Pub. No.: WO2019/207208
PCT Pub. Date: Oct. 31, 2019

(65) Prior Publication Data
US 2021/0245883 A1    Aug. 12, 2021

Related U.S. Application Data

(60) Provisional application No. 62/744,142, filed on Oct. 11, 2018, provisional application No. 62/663,280, filed on Apr. 27, 2018.

(51) Int. Cl.
| | |
|---|---|
| *B64D 9/00* | (2006.01) |
| *B64F 1/36* | (2017.01) |
| *B65G 57/03* | (2006.01) |
| *B65G 57/24* | (2006.01) |

(52) U.S. Cl.
CPC .......... *B64D 9/00* (2013.01); *B64F 1/368* (2013.01); *B65G 57/03* (2013.01); *B65G 57/24* (2013.01); *B64D 2009/006* (2013.01); *B65G 2201/0264* (2013.01); *B65G 2203/0225* (2013.01); *B65G 2203/0233* (2013.01)

(58) Field of Classification Search
CPC . B64D 9/00; B64F 1/368; B64F 1/322; B64G 57/24
USPC ...................................................... 244/137.1
See application file for complete search history.

(56) References Cited

U.S. PATENT DOCUMENTS

| | | | |
|---|---|---|---|
| 4,802,810 A | 2/1989 | Gunn | |
| 4,832,553 A * | 5/1989 | Grey | A01D 90/08 414/528 |
| 2005/0002772 A1 * | 1/2005 | Stone | B65G 63/002 414/331.06 |
| 2014/0356110 A1 * | 12/2014 | Rawdon | B60P 1/6481 414/349 |

(Continued)

FOREIGN PATENT DOCUMENTS

| | | | |
|---|---|---|---|
| CN | 106144624 B | * | 8/2017 |
| DE | 3722299 A1 | * | 10/2008 |

(Continued)

*Primary Examiner* — Christopher P Ellis

(57) ABSTRACT

According to an example aspect of the present invention, there is provided method of preparing a plurality of items for air transport, in which method a plurality of items is consolidated into a bundle which has a shape corresponding to the contour or part of the contour of a unit load device. The bundle is loaded into the unit load device so as to populate the volume or part of the volume of the unit load device.

19 Claims, 28 Drawing Sheets

(56) References Cited

U.S. PATENT DOCUMENTS

2018/0057284 A1\* 3/2018 Carpenter ............... B65G 57/22

FOREIGN PATENT DOCUMENTS

| DE | 102009039277 A1 | | 3/2011 | | |
|----|----|----|----|----|----|
| DE | 102012008128 A1 | | 10/2013 | | |
| EP | 1577236 A1 | | 9/2005 | | |
| EP | 2025630 A1 | \* | 2/2009 | ............ | B65B 35/40 |
| EP | 2832667 A1 | \* | 2/2015 | | |
| ES | 2639214 T3 | \* | 10/2017 | | |
| GB | 2552025 A | \* | 1/2018 | | |
| GB | 2583037 A | \* | 10/2020 | | |
| WO | WO-2014197920 A1 | \* | 12/2014 | | |
| WO | WO2015037987 A1 | | 3/2015 | | |
| WO | WO2015197070 A1 | | 12/2015 | | |
| WO | WO-2019007215 A1 | \* | 1/2019 | | |

\* cited by examiner

A.

B.

C.

BOTTOM, FORWARD

BOTTOM, YAWED 45°

WITH AN AKH
BOTTOM, BACKWARD

WITH AN AKH
BOTTOM, YAWED -45°

LEFT, HORIZONTAL

LEFT, PITCHED FORWARD

LEFT, PITCHED BACKWARD

FRONT, HORIZONTAL

FRONT, ROLLED 45°

FRONT, ROLLED 90°

Illustration of
phase F. in Figure 26.

METHOD OF AND SYSTEM FOR PREPARING A PLURALITY OF ITEMS FOR AIR TRANSPORT

FIELD

The present disclosure relates to loading unit load devices used to transport items in aviation.

BACKGROUND

Technology and solutions for the automated loading of baggage and cargo piece-goods to air transport unit load devices, mostly based on the air transport containers of the type AKE and AKH but also in a few occasions targeting some of the standard air pallet types utilized in air cargo transport, have been developed since early 1990s. The only production systems with robotic loading units publicly announced and also presented in the media are in Schiphol (Amsterdam, the Netherlands) and Heathrow (London, United Kingdom) airports. Their loading cycle times, hourly loading capacities, and overall efficiencies are still low, and as such they can't compete with manual or semi-manual loading processes. Several attempts to solve the two critical tasks of loading piece-goods, more precisely cargo and baggage items, have been made utilizing robotic technology, some of which have also resulted patent applications. However, the piece-wise robotic loading approach followed by these attempts to robotize the loading process has proven to be too slow and the resulting baggage make-up and/or cargo build-up process quality non-optimal, especially with regard to the utilization of the available space within the container, but also similarly considering the volume utilization of the unit load devices of the air cargo transport industry. Thus, no investment so far has had any reasonable pay-back and the automation has had to be justified on other benefits, such as work ergonomics and health and safety improvements.

A need exists for a system for the loading of air-eligible baggage and cargo for transporting on air-transport vehicles by combining automated and manual process phases on a level that is efficient, economically feasible, safe and secure, ergonomic or employee-friendly, or provides sufficient operational capacity, throughput and quality for both the existing and the future ground handling processes, operations and facilities.

The present method and system is intended to meet at least some of these needs or at least provide the public with a useful alternative.

SUMMARY

The invention is defined by the features of the independent claims. Some specific embodiments are defined in the dependent claims.

According to a first aspect of the present invention, there is provided a method of preparing a plurality of items for air transport, in which method a plurality of items is consolidated into a bundle which has a shape corresponding to the contour or part of the contour of a unit load device. The bundle is loaded into the unit load device so as to populate the volume or part of the volume of the unit load device. The consolidating phase includes consolidating a first bundle with a first sub-plurality of the plurality of items to be loaded into the unit load device. The first bundle has a prismatic shape or a shape with a trapezoidal cross-section corresponding to a respective contour or part of the contour of a unit load device. The consolidating phase includes consolidating a second sub-plurality of the plurality of items into a second bundle. The second bundle has another pre-defined shape. The loading of the first bundle populates a first sub-volume of the volume of the unit load device and the loading of the second bundle populates a second sub-volume of the volume of the unit load device, wherein the first bundle is loaded before the second bundle to a sub-volume which is enclosed.

Various embodiments of the first aspect may comprise at least one feature from the following bulleted list:
- the bundle is a first bundle comprising a first sub-plurality of the plurality of items to be loaded into the unit load device;
- the loading of the first bundle populates a first sub-volume of the volume of the unit load device;
- the method comprises consolidating a second sub-plurality of the plurality of items into a second bundle;
- the method comprises loading the second bundle into the unit load device so as to populate a second sub-volume of the volume of the unit load device;
- the shape or size or both the shape and size of the first bundle is different to that of the second bundle;
- during or after said consolidation, tying the items of the bundle together so as to maintain the shape of the bundle;
- said tying comprises applying to the bundle a tying device belonging to a group comprising wrapping, bands, nets, ties, glue, hooks, and any combination of the above;
- the items are consolidated into a jig which defines the shape of the bundle;
- the bundle is loaded into the unit load device using the jig;
- the first bundle is consolidated or loaded or both consolidated and loaded using a first jig;
- the second bundle is consolidated or loaded or both consolidated and loaded using a second jig;
- the first bundle is consolidated or loaded or both consolidated and loaded using an adjustable jig in a first configuration;
- the second bundle is consolidated or loaded or both consolidated and loaded using the adjustable jig in a second configuration;
- the unit load device specifies or encloses an inner volume with a shape or contour, into which the bundle or bundles are loaded;
- in pre-load planning the inner volume of the unit load device is divided into sub-volumes, which are matched by the first and second bundle during loading;
- the first bundle has a prismatic shape or a shape with a trapezoidal cross-section;
- the second bundle has another pre-defined shape;
- the first bundle is loaded before the second bundle to a sub-volume which is enclosed;
- the unit load device is manipulated during the method;
- the first bundle is loaded in a first orientation of the unit load device;
- the second bundle is loaded in a second orientation of the unit load device, which second orientation is different to the first orientation;
- said manipulation includes tilting of the unit load device;
- the manipulation includes manipulation in two or more, particularly six, degrees of freedom;
- when loading a first bundle to a sub-volume of the unit load device that is enclosed;
- the unit load device is first tilted such that said sub-volume is above the opposite end of the unit load device;
- the first bundle is then loaded to said sub-volume;

the unit load device is then tilted such that sub-volume containing the first bundle is below the opposite end of the unit load device to receive the second bundle thereon;

the first bundle or the second bundle is temporarily secured to the unit load device for manipulation of the unit load device by inserting a retainer into the unit load device;

a first retainer is used to secure the first bundle and a second retainer is used to secure the second bundle to the unit load device;

the retainer(s) is/are removed from the unit load device at the latest before closing the unit load device;

the unit load device loaded with one or more bundles is supplemented by loading therein one or more individual items;

the method is a partially or fully automated method.

According to a second aspect of the present invention, there is provided a system for preparing a plurality of items for air transport. The system includes a first jig or a first configuration of an adjustable jig for receiving a first sub-plurality of a plurality of items. The first jig or first configuration of an adjustable jig is configured to consolidate a first bundle of said first sub-plurality of items, which first bundle has a shape corresponding to the contour or part of the contour of a unit load device, which first jig or first configuration of an adjustable jig is configured to produce a prismatic shape or a shape with a trapezoidal cross-section. The system includes a second jig or second configuration of an adjustable jig which is configured to consolidate a second bundle from a second sub-plurality of the plurality of items. The second bundle has a different shape or size or both shape and size to the first bundle. The system includes a unit load device (ULD) jig which is configured to manipulate the load unit device during loading.

Various embodiments of the first aspect may comprise at least one feature from the following bulleted list:

the jig is shaped to match the contour or part of the contour of the unit load device;

the jig comprises a container with at least one side open for receiving a plurality of items;

the jig is a first jig which is configured to consolidate a first bundle from a first sub-plurality of the plurality of items;

the system comprises a second jig which is configured to consolidate a second bundle from a second sub-plurality of the plurality of items, which second bundle has a different shape or size or both shape and size to the first bundle;

the jig is adjustable between a first configuration, which is configured to consolidate a first bundle from a first sub-plurality of the plurality of items, and a second configuration, which is configured to second bundle from a second sub-plurality of the plurality of items, which second bundle has a different shape or size or both shape and size to the first bundle;

the first jig is configured to produce a prismatic shape or a shape with a trapezoidal cross-section;

the second jig is configured to produce another predefined shape;

the jig is configured to load the bundle into the unit load device;

the system comprises a jig manipulator which is configured to manipulate the jig so as to load the unit load device;

the loading manipulator is a robot, particularly a multi-axis robot;

the system comprises a robot, particularly a multi-axis robot, with a gripper configured to grip the bundle produced by the jig or an external consolidation mold and load the bundle into the unit load device;

the system comprises a unit load device (ULD) jig which is configured to tilt the load unit device during loading;

the ULD jig is configured to provide three or more degrees of freedom;

the ULD jig is configured to freely rotate the unit load device 10 degrees or more, particularly 180 degrees or more;

the robot and the ULD jig are synchronized with each other;

the system comprises a tying station which is configured to during or after the said consolidation tying the items of the bundle together so as to maintain the shape of the consolidated bundle;

the system is a partially or fully automated system.

BRIEF DESCRIPTION OF THE DRAWINGS

The detailed description will be better understood in conjunction with the accompanying drawings as follows.

Figure 16:
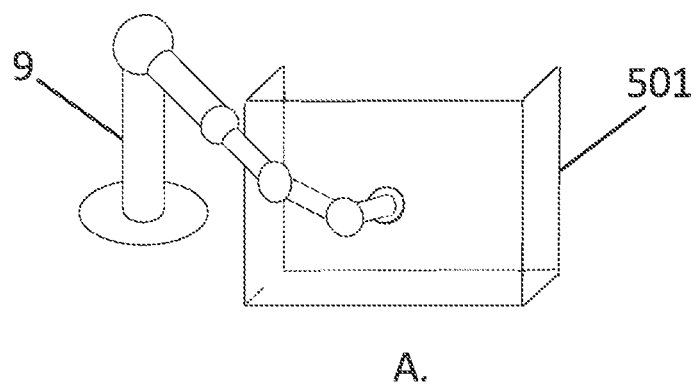
Figure 16:
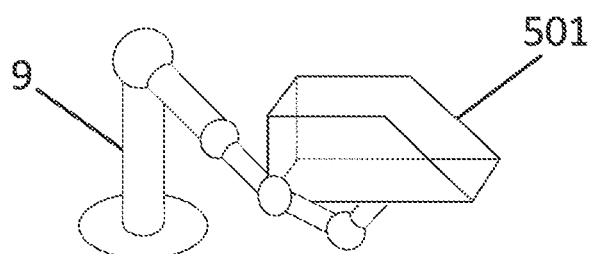
Figure 16:
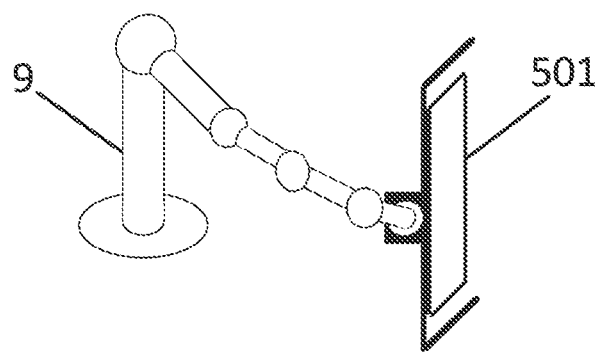
Figure 17:
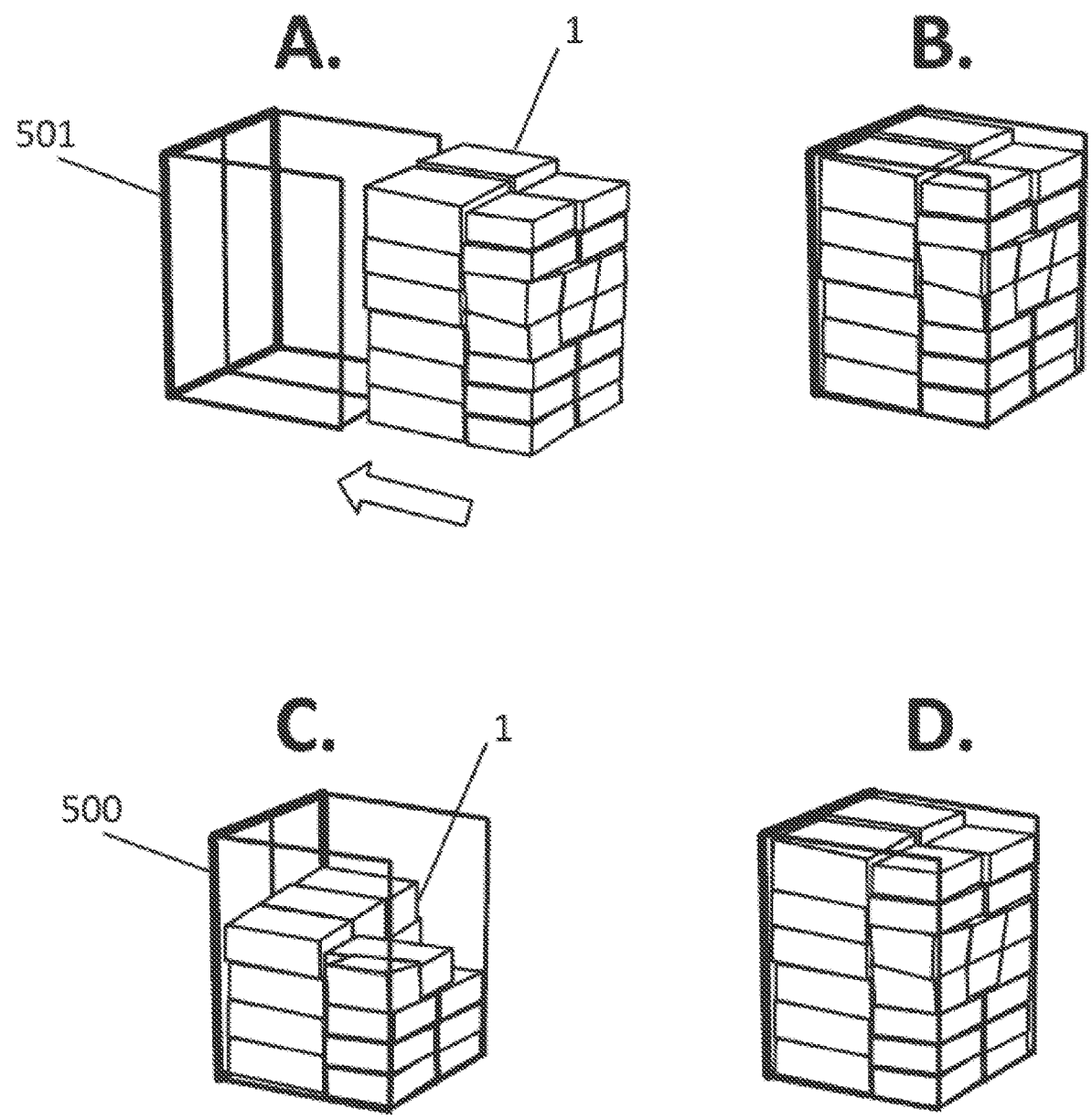
Figure 18:
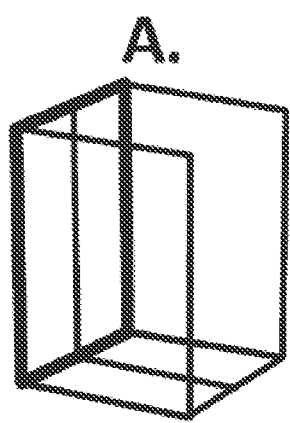
Figure 18:
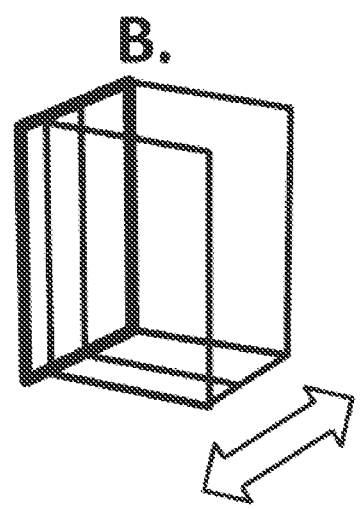
Figure 18:
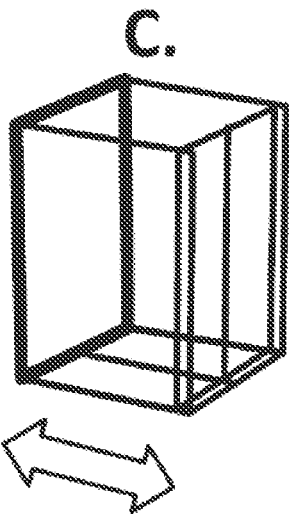
Figure 18:
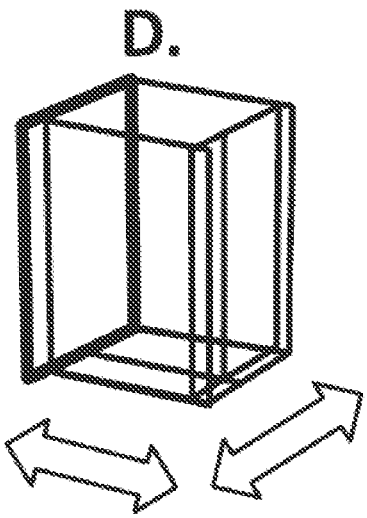
Figure 19:
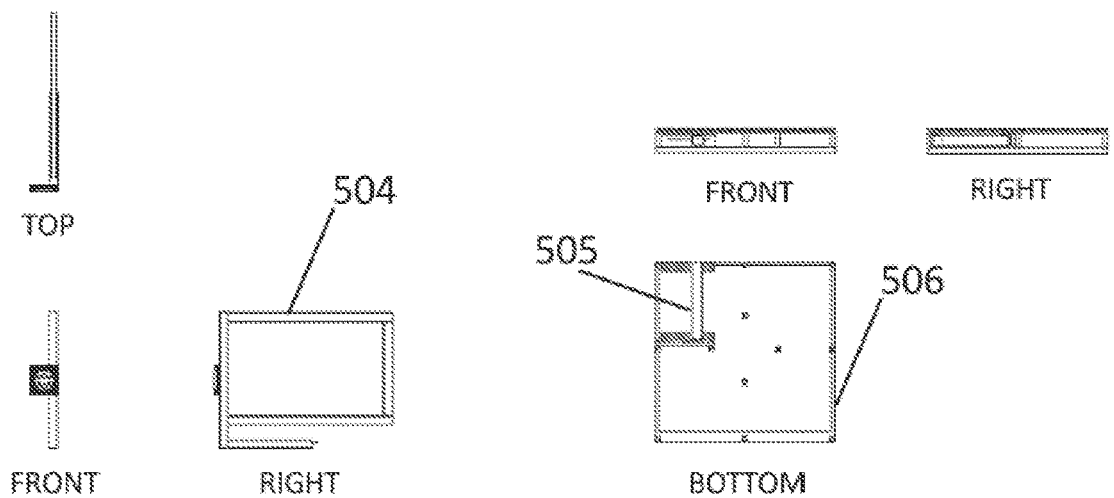
Figure 19:
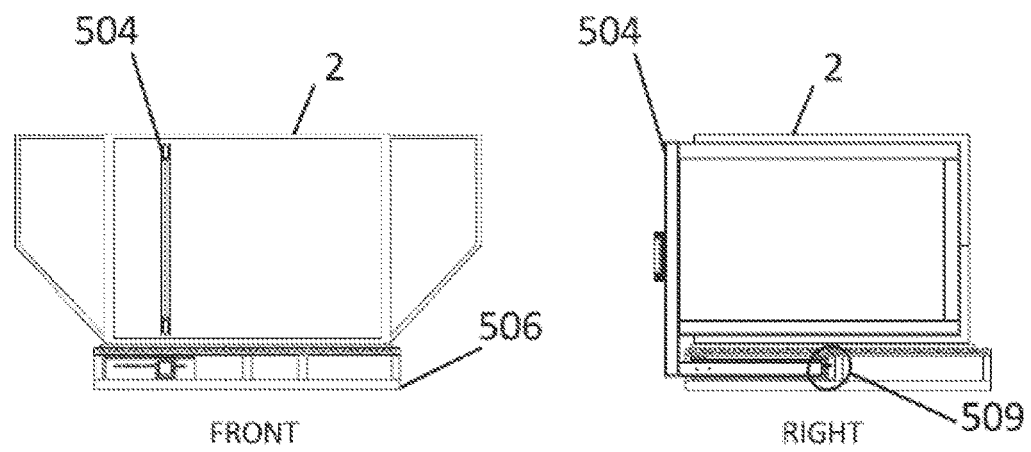
Figure 19:
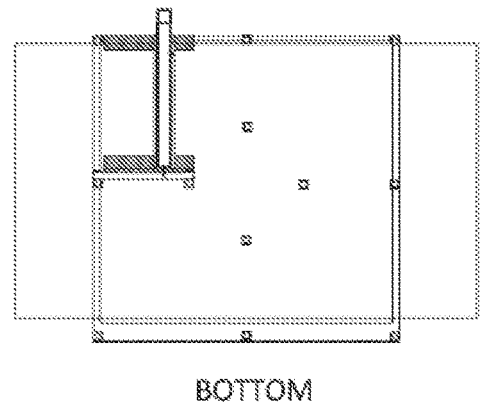
Figure 20:
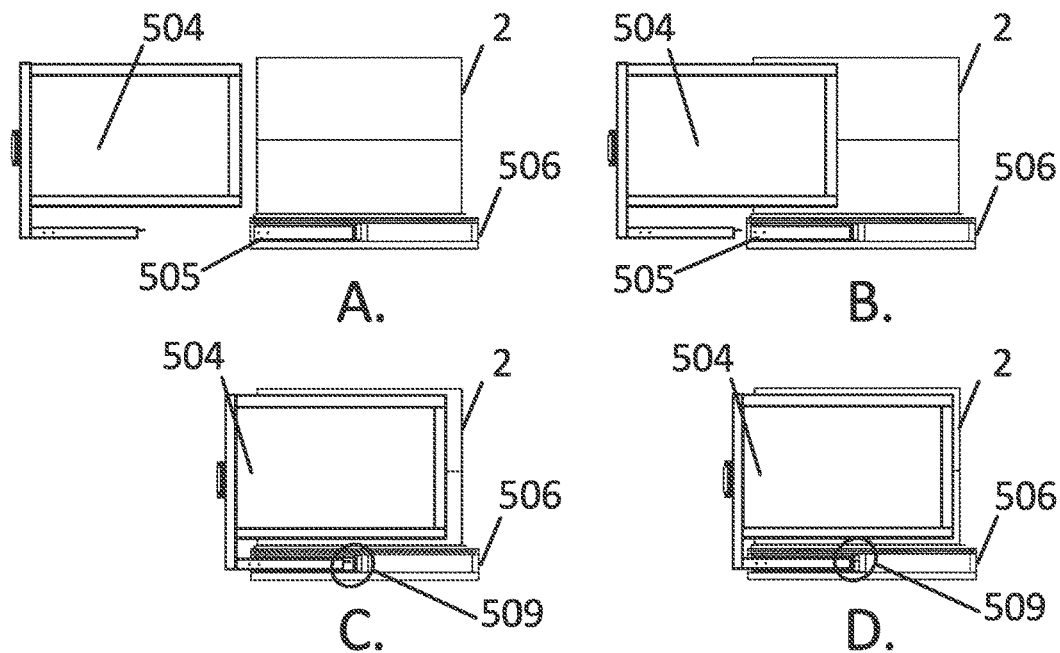
Figure 21:
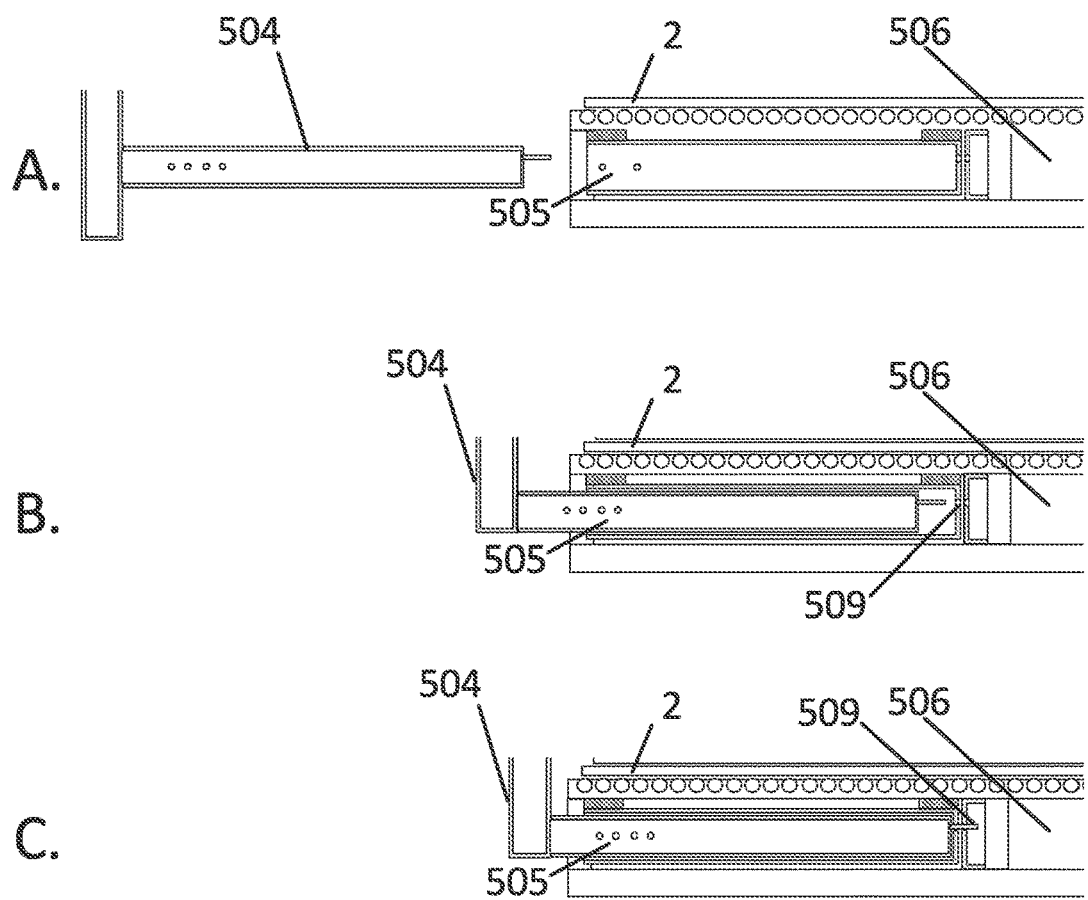
Figure 26:
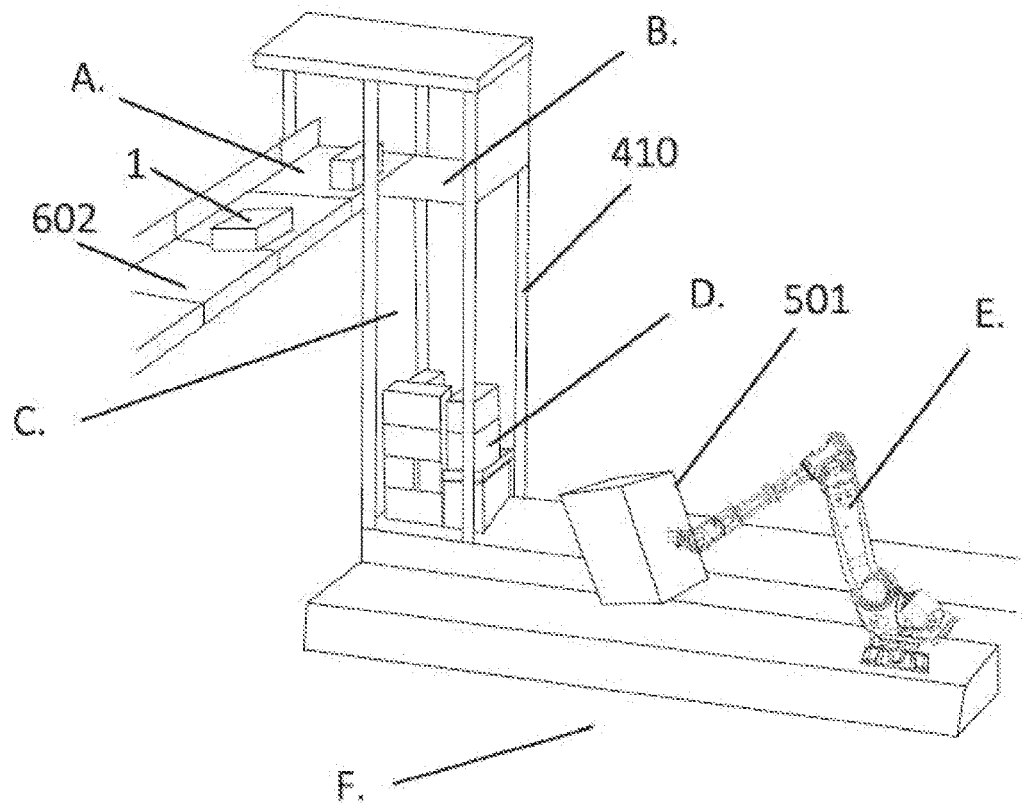
Figure 27:
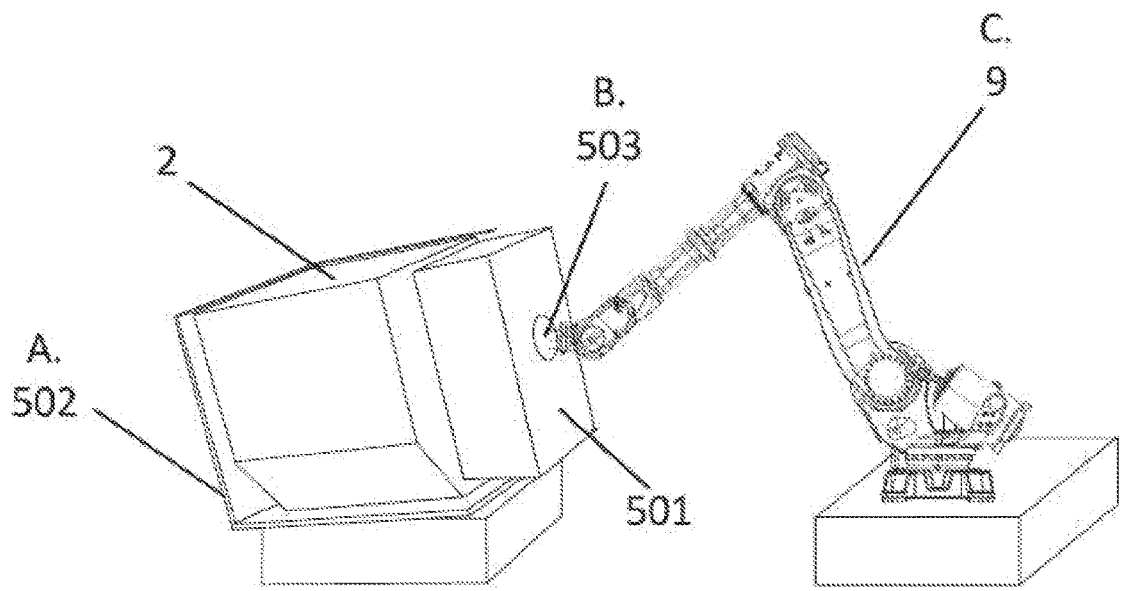
Figure 28:
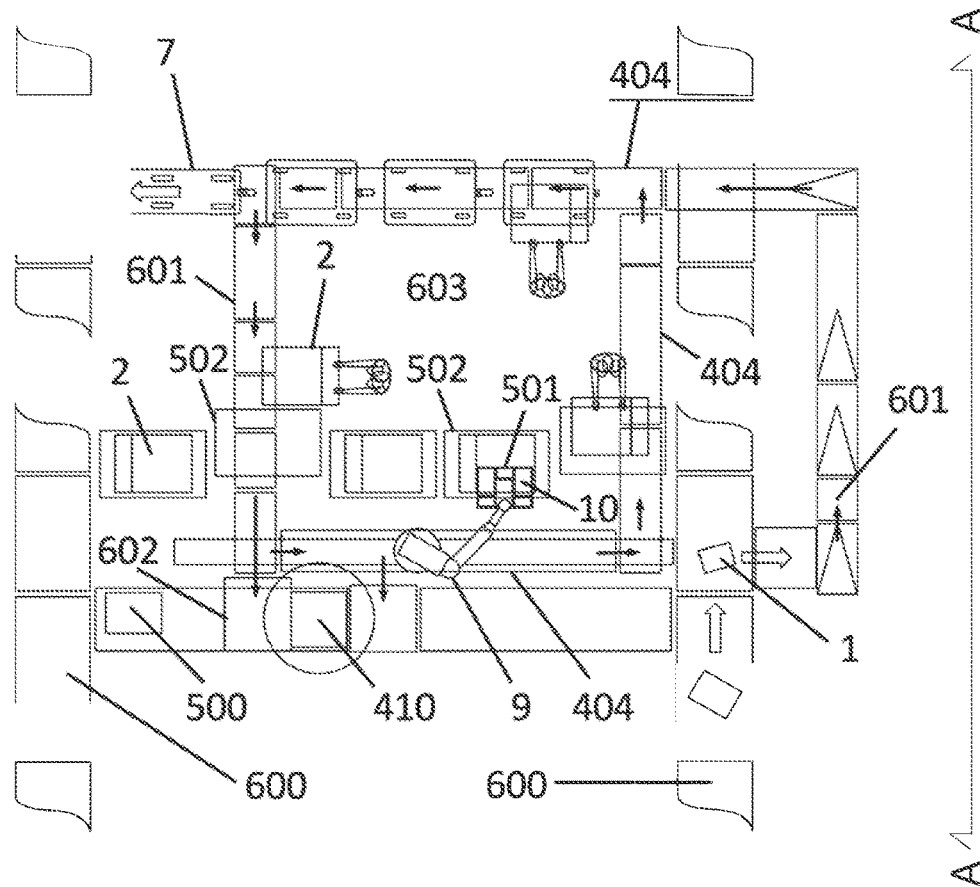
Figure 29:
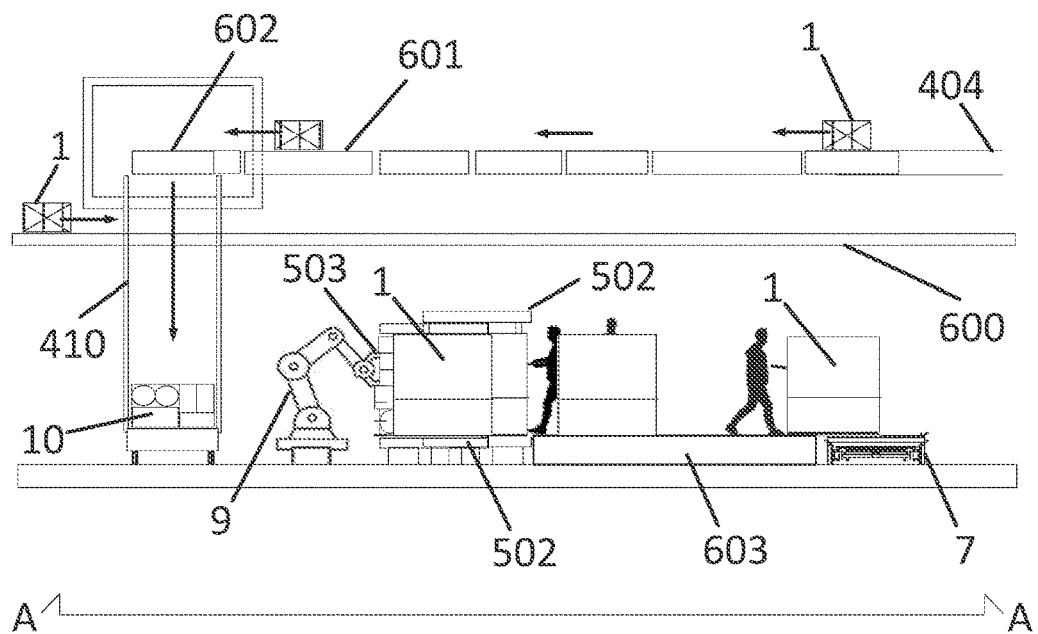

Through the FIGS. 9-11 and 12-15, the process the System operates upon is illustrated by presenting a set of step-wise front views (the side with the opening for loading towards the viewer) to two main types of air transport unit load devices (2) utilized in aviation coded as "AKE" and "AKH", as applying the System for consolidated loading of piece-goods into ULDs (2), in accordance with at least some embodiments of the present invention;

FIGS. 16-18 present higher-level example embodiments of the various Grippers (501) with a fixed structure or embedded mechanisms for adjusting the position of their side and bottom structures the System can utilize both in the consolidation of the piece-goods into Consolidated blocks of piece-goods (10) and in the loading of them into the ULDs (2), accord, in accordance with at least some embodiments of the present invention;

FIGS. 19-21 present more detailed example embodiments of the various Grippers (501) the System can utilize both in the consolidation of the piece-goods into Consolidated blocks of piece-goods (10) and in the loading of them into the ULDs (2), in accordance with at least some embodiments of the present invention;

FIGS. 22-25 present a set of back, front, left and bottom views to a ULD Jig (502) designed for manipulating an AKH type of an air transport unit load device (2) utilized in aviation as part of a System applying the method and process for consolidated loading of piece-goods, in accordance with at least some embodiments of the present invention;

FIG. 26 presents an embodiment of the System's consolidation phase set-up, within which the piece-goods (1) are input to the Consolidation Station (410) from above and the finalized Consolidated block of piece-goods (10) will either be built or first into a Consolidation mold (500) and then transferred into the Gripper (501), or consolidated directly into a Gripper (501), and then picked up from the lower part of the present Consolidation Station (410) and taken for the loading into the ULD (2) for example by using a loading manipulator (9), in accordance with at least some embodiments of the present invention;

FIG. 27 presents an embodiment of the System's ULD Jig (502) set-up, in which a Consolidated block of piece-goods (10) is being loaded into an ULD (AKE type) using a type "Block" Gripper (502) connected to a loading manipulator (9) with the aid of a Quick-mount adaptor (503) at the end of the robotic arm of it, in accordance with at least some embodiments of the present invention;

FIGS. 28 and 29 present an embodiment of the System for loading of consolidated piece-goods into ULDs, in accordance with at least some embodiments of the present invention;

EMBODIMENTS

In the present context, the expression "volume of the unit load device" refers to a standard volume and shape defined for a particular type of a unit load device. Examples of such standard volumes include LD1, LD2, LD3, PLA Pallet, LD7 winged pallet, and LD6, to name a few. The standard volume and shape apply not only to containers that themselves enclose an inner volume but also to air pallets which are to be loaded such that the loaded air pallet conforms to aviation requirements for volume, dimensions, and shape. To be more precise, the items loaded onto the air pallet or within the air container populate the volume and shape of the resulting unit load device within the meaning of the present context.

The terms "piece-good" and "item" as used herein are, for simplicity, to be interpreted as mutually interchangeable.

The terms "piece-goods" and "a plurality of items" as used herein are, for simplicity, to be interpreted as mutually interchangeable.

The terms "a group of piece-goods" and "a bundle of items" as used herein are, for simplicity, to be interpreted as mutually interchangeable.

The terms "consolidated loading of piece-goods" and "loading of a plurality of items" as used herein are, for simplicity, to be interpreted as mutually interchangeable.

The terms "enclosing a group of piece-goods" and "tying the items of the bundle together" as used herein are, for simplicity, to be interpreted as mutually interchangeable.

The term "air-transport vehicle" as used herein can refer to any known air-based vehicles, such as airplanes, jets, helicopters, drones, and other vessels which can fly from one point to another carrying items, such as baggage or cargo.

The term "land transport vehicle" as used herein can refer to any known land-based vehicles, such as trucks, semi-trucks, trailers, vans, lorries, station wagons, cars, trains, and other devices which can carry items, such as baggage or cargo, moving on the earth, or rail-based.

The term "airport" as used herein can refer to any airstrip where air-transport vehicles can land, which can be capable of moving items, such as baggage or cargo, via the air.

The term "storage" as used herein can refer to an automated storage and retrieval system that scans and stores items, such as baggage and/or cargo, and/or ULDs on piece-level based on information originating from various sources within and outside the System.

The term "buffer" as used herein can refer to an automated storage and retrieval system that constitutes an intermediate storage for a plurality of items and/or ULDs within the loading process.

The term "baggage" as used herein can refer to air eligible passenger baggage.

The term "cargo" as used herein can refer to air eligible cargo.

The term "baggage information" as used herein can refer to information on a piece of baggage provided by the airport baggage handling system, a third party system prior to baggage entering the airport facility, or the entire baggage handling chain of operations.

The term "cargo information" as used herein can refer to information on cargo provided for example by the cargo handling system of the cargo facility at or off the airport, a shipper and/or consignor prior to the cargo entering the process, a third party prior to the cargo entering the facility, or the entire cargo handling chain of operations.

The term "baggage profile" as used herein can refer to, but is not limited to, the baggage and passenger related information plus the scheduling information with transport vehicle identifiers, storage zone identifiers, and duration to destination times required by the departing flights.

The term "cargo profile" as used herein can refer, but is not limited to, the any cargo related information, such as the scheduling information with all the air and land-based transport vehicle identifiers related to the entire logistics chain, piece-level and consolidated items and ULD storage zone identifiers, and expected processing and destination times required by the local cargo handling operation and the different parties within the cargo logistics chain.

The term "end-user terminal" as used herein can refer to any known client device on wired or wireless data connection, such as cellular and smart phones, laptops, computers, tablet computers, combinations thereof, or other processing devices capable of bidirectional communication.

The terms "data storage" or "database" as used herein refers to a non-transitory computer readable medium, such as a hard disk drive, solid state drive, optical drive, flash drive, tape drive, and the like. The term "non-transitory computer readable medium" excludes any transitory signals but includes any non-transitory data storage circuitry, e.g., buffers, cache, and queues, within transceivers of transitory signals.

The term "high security" as used herein can refer to a level of government-imposed security, such as that applied by the Transportation Security Administration "TSA" in airports in the United States or globally by the member states of the International Civil Aviation Organization "ICAO".

The term "network" as used herein can refer to any known network, such as a satellite network, a cellular network, a global processing network, such as the internet, a local area network, a wide area network, or combinations thereof.

The term "processor" as used herein can refer any known processor, such as a computer, a hand-held processing device, a laptop, an IoT device, an embedded chip, a crypto anchor, a wearable computer, a tablet computer, a cloud computing processor or server, or combinations thereof.

Before explaining the method and system in detail, it is to be understood that the ones present are not limited to the particular embodiments and that they can be practiced or carried out in various ways.

The present embodiments relate to any type of baggage and/or cargo collection and/or processing facility at an airport, and/or operably connected to an airport, and/or located away from an airport.

The present embodiments relate to the loading of air transport unit load devices (ULD) with a plurality of items by utilizing automatic, semi-automatic, and/or manual means for carrying out the processes and individual tasks included.

The present embodiments relate to the planning and implementation of the consolidation of a plurality of items into bundles according to the contours of the items, the bundles of items, and the air transport unit load devices, and a number of other characteristics thereof having an impact on the consolidation.

The present embodiments relate to the planning and implementation of the ULD loading sequence of the plurality of items into target air transport unit load devices.

The present embodiments relate to the loading of a plurality of items manipulating them in any position, orientation or configuration into target air transport unit load devices that in turn may be in any position or orientation during the loading process.

The present embodiments relate to the consolidation of a plurality of items into bundles.

The present embodiments relate to the consolidation of a plurality of items into bundles that may be, with or without an air-eligible skid or pallet, enclosed utilizing materials, methods, technology and solutions common practice in the art of automated packaging.

The present embodiments relate to the loading of a plurality of items into target air transport unit load devices utilizing a Gripper (501) in the consolidated loading of a plurality of items.

The present embodiments relate to the loading of a plurality of items into target air transport unit load devices utilizing an ULD Jig in the consolidated loading of a plurality of items.

The present embodiments relate to the high-level architecture of the loading process implementing the present method of loading of a plurality of items into air-transport unit load devices.

The present embodiments relate to the System implementing the automated loading of a consolidated plurality of items into air-transport unit load devices.

In present embodiments, all functions and processes can take place within a zone or arrangement for carrying out piece-level identification and security inspection, customs operations, tax office and/or any governmental agency functions, and/or for any other task required in the operation.

In present embodiments, individual items, such as baggage or cargo pieces, or their consolidations into one or several pluralities of items with or without a pallet or skid, any air-transport pallet or ULD, can be labelled and/or identified using various current and future means for identification, such as bar codes, RFID tags, IoT devices and readers/scanners/identification devices thereof, which in turn can be connected to a data communication network for accessing and/or communicating with other local and/or remote and/or cloud-based data, computing equipment and other devices, all of these of which can be mounted to the baggage and/or cargo, stationary, reside at a third location, or be mobile.

In present embodiments, individual items, such as baggage or cargo pieces, or their consolidations into one or several pluralities of items, and ULDs can be connected with above-said means for communication to network(s) and computer(s) that enable carrying out various process and operation planning, monitoring, control, and reporting tasks, including but not limited to for example running various scheduling models and scenarios to automate the item, such as baggage and cargo, movement process not only within for example a baggage and/or cargo handling facility, but also within other facilities, and along the entire logistics chain including both land based and air based transport vehicles.

In present embodiments, the data device on the items, such as baggage and/or cargo pieces, can be any type of near-to-far field radio frequency identifier devices such as RFID, an embedded computing device or other such wirelessly communicating entity with electronic baggage identification, reconciliation and/or characterizing information or cargo-relating information, such as air bill information.

In present embodiments, the data device on the items, such as baggage and/or cargo pieces, can be any type of label, such as baggage tag or air bill label, readable by an optical character recognition reader that can be connected to the communicating network for transmitting the related information.

In present embodiments, the loading process produces "ULD manifest information" including but not limited to the ULD- and piece-goods-level information making the air transport unit load device air-eligible from the viewpoint of documentation.

Figure 1A:
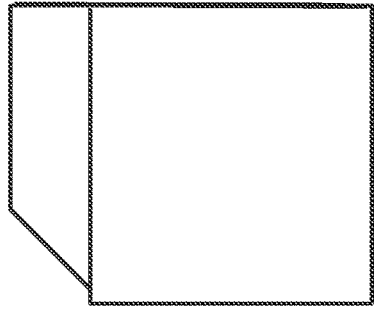
FIGS. 1A-1B and 2A-2C present top and front (the side with the opening for loading) views to two main types of air transport unit load devices utilized in aviation coded as AKE and AKH, as applying the method and process for automated preparation and consolidated loading of baggage on them, in accordance with at least some embodiments of the present invention.
Figure 1A:
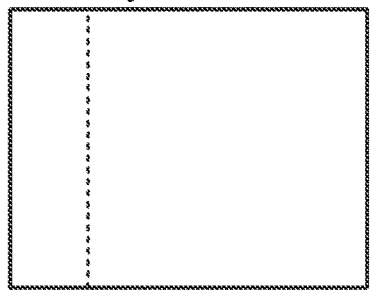
Figure 1A:
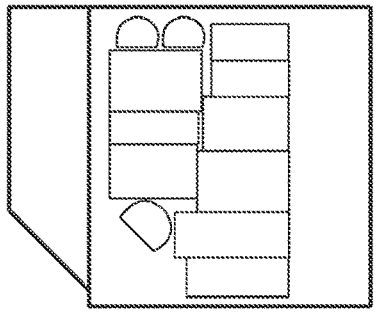
Figure 1A:
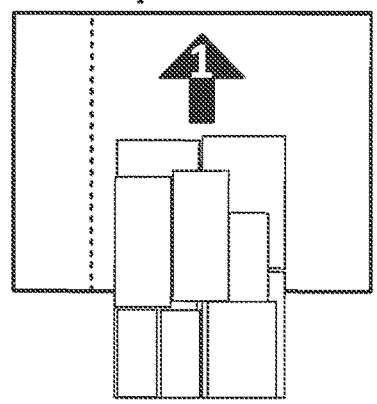
Figure 1A:
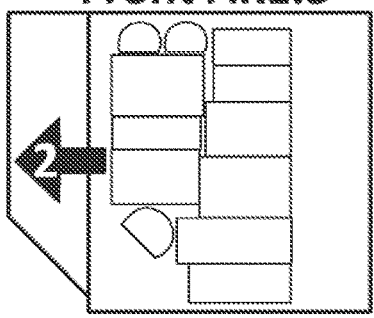
Figure 1A:
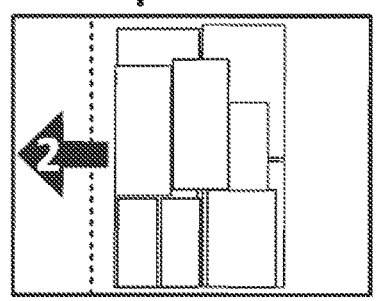
Figure 1A:
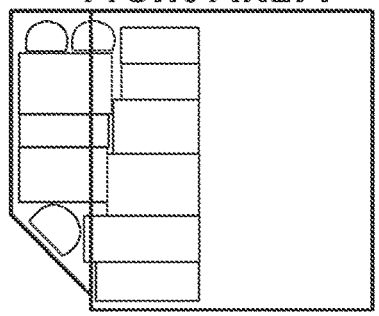
Figure 1A:
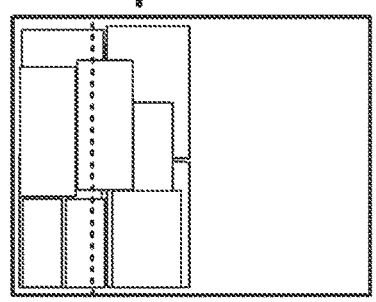
Figure 1B:
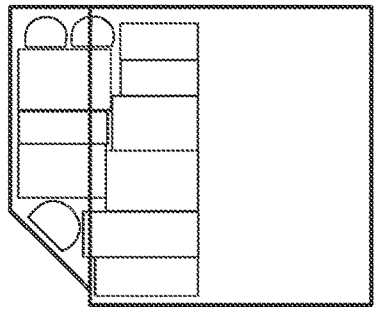
Figure 1B:
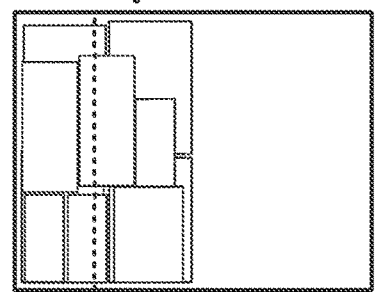
Figure 1B:
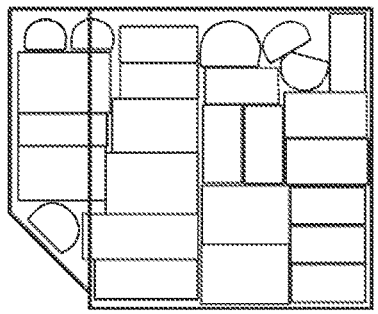
Figure 1B:
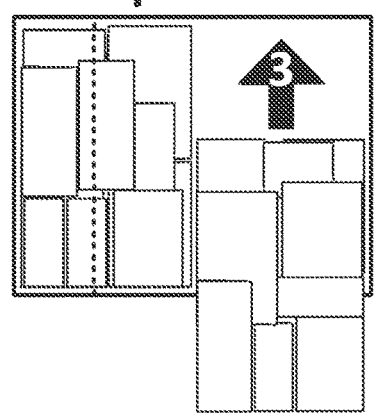
Figure 1B:
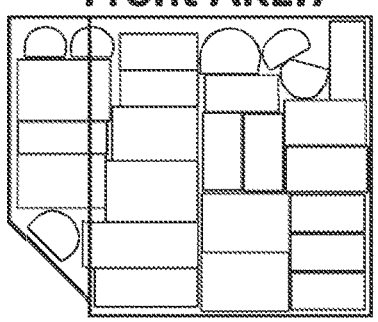
Figure 1B:
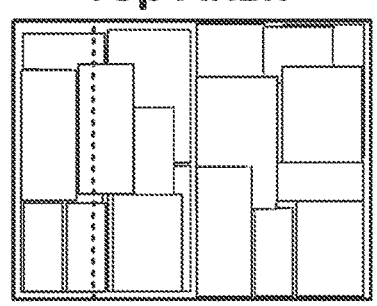
Figure 1B:
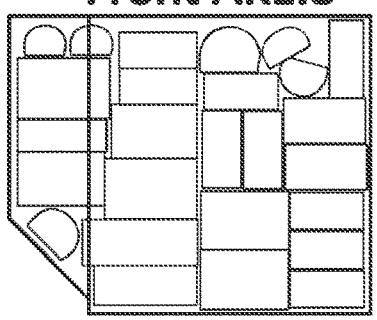
Figure 1B:
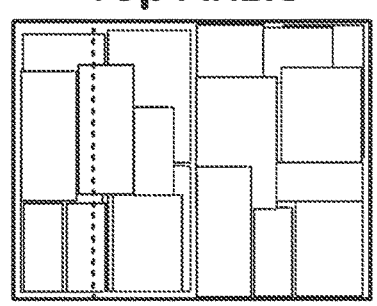

Turning now to the Figures, the sets of detailed pictures within FIGS. 1A-1B illustrate the present loading method through an example requiring three manipulation steps for loading two groups of pieces (10) of baggage into an air-transfer unit load device (2) of the type "AKE" that is an air transfer eligible container. The detailed pictures titled "Front.1" through "Front.8" and "Top.1" through "Top.8" represent the front view and top view to the AKE air transfer container (2) throughout the example process advancing from start state to end state. The "Front.x" and "Top.x" pictures, where x=[1, 2, 3, . . . , 8], are to be viewed side-by-side, as they represent the same process state, as seen from front and top simultaneously.

In the initial (start) stage in FIG. 1A, top row with pictures titled "Front.1" and "Top.1" the target AKE (2) is empty.

Next in FIG. 1A, as shown by the two pictures in the second row from the top with titles "Front.2" and "Top.2", the first group of pieces of baggage (10) has entered halfway into the target AKE (2), and thus it is illustrating an instant of time while carrying out the step 1 of the example embodiment of the present loading method, the dashed arrow labeled "1" depicting the direction of current motion.

Next in FIG. 1A, as shown by the two pictures in the third row from the top with titles "Front.3" and "Top.3", the first group of pieces of baggage (10) is completely inside the target AKE (2) at the end of step 1 of the present loading method. The dashed arrow labeled "2" depicts the direction of motion within the step 2 of the example embodiment of the present loading method.

Next in FIG. 1A, as shown by the two pictures in the third row from the top with titles "Front.3" and "Top.3", the first group of pieces of baggage (10) is completely inside the target AKE (2) at the end of step 1 of the example embodiment of the present loading method.

Last in FIG. 1A, as shown by the two pictures in the bottom row with titles "Front.4" and "Top.4", the first group of pieces of baggage (10) is at the desired position inside the target AKE (2) at the end of step 2 of the example embodiment of the present loading method.

Continuing the first AKE-example in FIG. 1B, top row with pictures titled "Front.5" and "Top.5", for clarity of presentation, shows the same state as already reached earlier.

Next in FIG. 1B, as shown by the two pictures in the second row from the top with titles "Front.6" and "Top.6", the second group of pieces of baggage (10) has entered half-way into the target AKE (2), and thus it is illustrating an instant of time while carrying out the step 3 of the example embodiment of the present loading method, the dashed arrow labeled "3" depicting the direction of current motion.

Next in FIG. 1B, as shown by the two pictures in the third row from the top with titles "Front.7" and "Top.7", the second group of pieces of baggage (10) is completely inside the target AKE (2) at the end of step 3 of the present loading method.

Last in FIG. 1B, as shown by the two pictures in the bottom row with titles "Front.8" and "Top.8", the both groups of pieces of baggage (10) is at their desired positions inside the target AKE (2) at the end of the example embodiment of the present loading method.

Figure 2A:
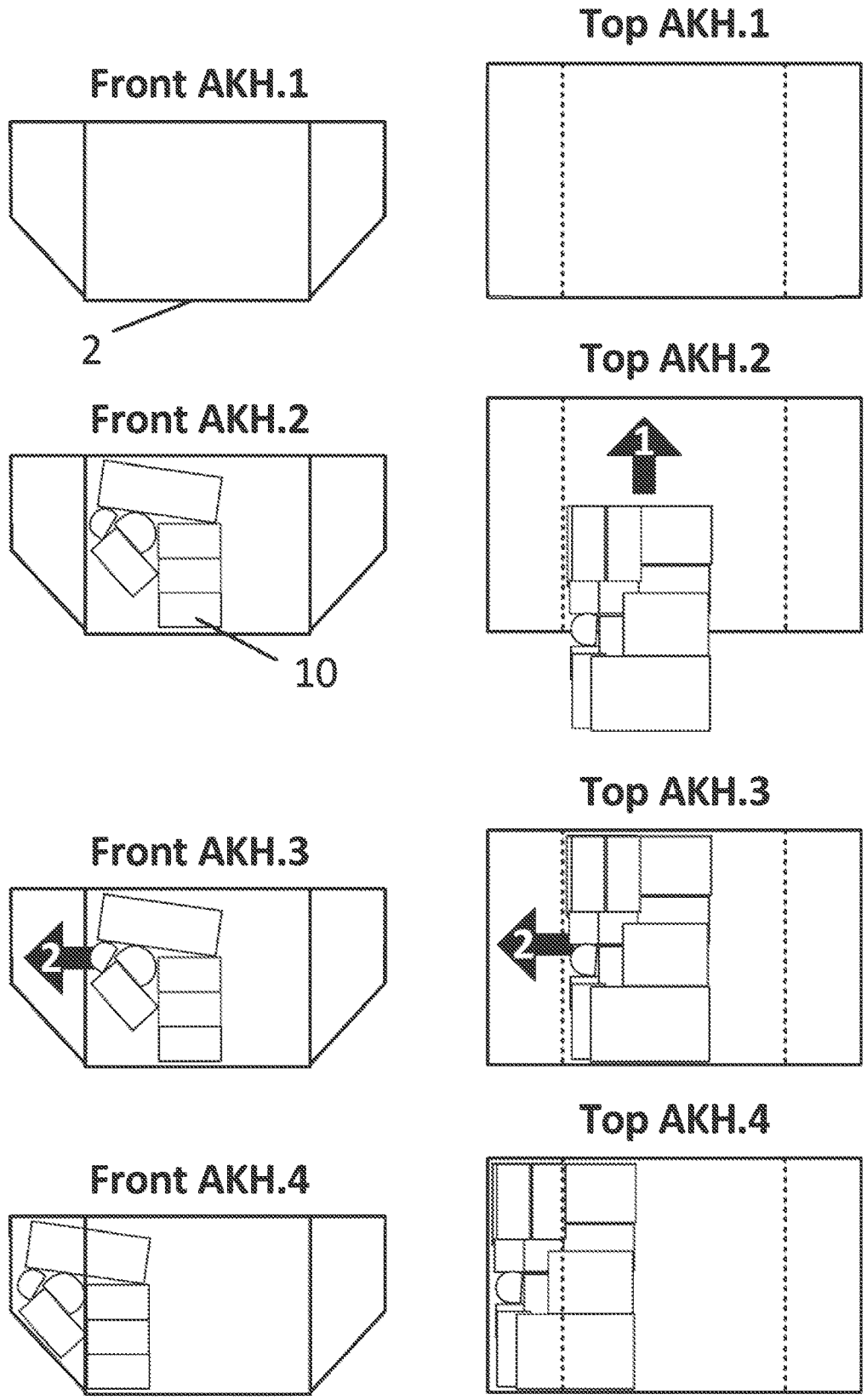
Figure 2B:
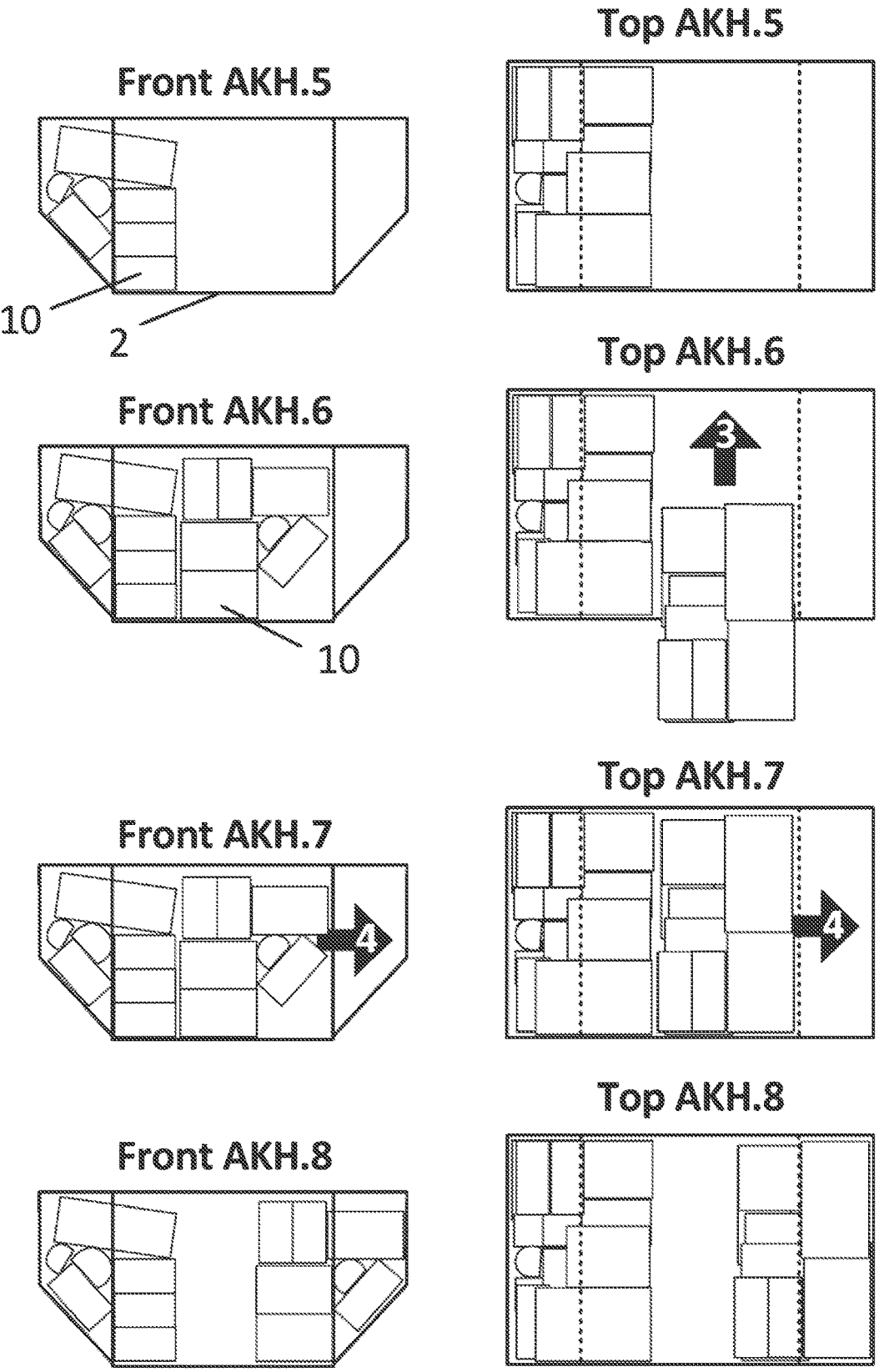
Figure 2C:
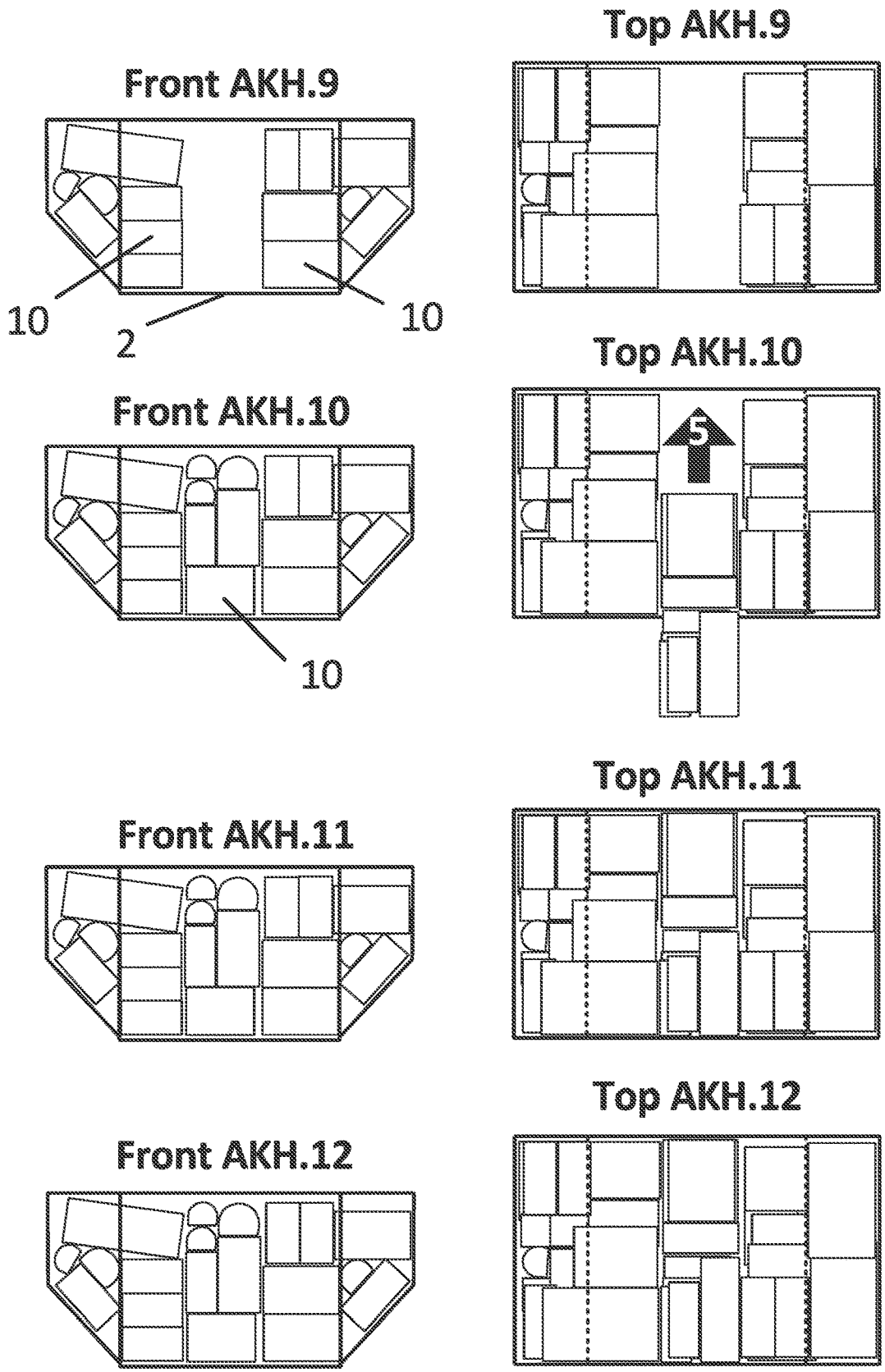

In another embodiment of the present loading method, the sets of detailed pictures within FIGS. 2A-2C illustrate the present loading method through an example process requiring five manipulation steps for loading three groups of pieces of baggage (10) into an air-transfer unit load device (2) of the type "AKH" that is an air transfer eligible container. The detailed pictures titled "Front.1" through "Front.12" and "Top.1" through "Top.12" represent the front view and top view to the AKH air transfer container (2) throughout the example process advancing from start state to end state. The "Front.x" and "Top.x" pictures, where x=[1, 2, 3, . . . , 12], are to be viewed side-by-side, as they represent the same process state, as seen from front and top simultaneously.

In the initial (start) stage in FIG. 2A, top row with pictures titled "Front.1" and "Top.1" the target AKH (2) is empty.

Next in FIG. 2A, as shown by the two pictures in the second row from the top with titles "Front.2" and "Top.2", the first group of pieces of baggage (10) has entered half-way into the target AKH (2), and thus it is illustrating an instant of time while carrying out the step 1 of the example embodiment of the present loading method, the dashed arrow labeled "1" depicting the direction of current motion.

Next in FIG. 2A, as shown by the two pictures in the third row from the top with titles "Front.3" and "Top.3", the first group of pieces of baggage (10) is completely inside the target AKH (2) at the end of step 1 of the present loading method. The dashed arrow labeled "2" depicts the direction of motion within the step 2 of the example embodiment of the present loading method.

Next in FIG. 2A, as shown by the two pictures in the third row from the top with titles "Front.3" and "Top.3", the first group of pieces of baggage (10) is completely inside the target AKH (2) at the end of step 1 of the example embodiment of the present loading method.

Last in FIG. 2A, as shown by the two pictures in the bottom row with titles "Front.4" and "Top.4", the first group of pieces of baggage (10) is at the desired position inside the target AKH (2) at the end of step 2 of the example embodiment of the present loading method.

Continuing the example in FIG. 2B, top row with pictures titled "Front.5" and "Top.5", for clarity of presentation, shows the same state as already reached earlier.

Next in FIG. 2B, as shown by the two pictures in the second row from the top with titles "Front.6" and "Top.6", the second group of pieces of baggage (10) has entered half-way into the target AKH (2), and thus it is illustrating an instant of time while carrying out the step 3 of the example embodiment of the present loading method, the dashed arrow labeled "3" depicting the direction of current motion.

Next in FIG. 2B, as shown by the two pictures in the third row from the top with titles "Front.7" and "Top.7", the second group of pieces of baggage (10) is completely inside the target AKH (2) at the end of step 3 of the present loading method.

Last in FIG. 2B, as shown by the two pictures in the bottom row with titles "Front.8" and "Top.8", the both groups of pieces of baggage (10) are at their desired positions inside the target AKH (2) at the end of step 4 of the example embodiment of the present loading method.

Continuing the example in FIG. 2C, top row with pictures titled "Front.9" and "Top.9", for clarity of presentation, shows the same state as already reached earlier.

Next in FIG. 2C, as shown by the two pictures in the second row from the top with titles "Front.10" and "Top.10", the third group of pieces of baggage (10) has entered half-way into the target AKH (2), and thus it is illustrating an instant of time while carrying out the step 5 of the example embodiment of the present loading method, the dashed arrow labeled "5" depicting the direction of current motion.

Next in FIG. 2C, as shown by the two pictures in the third row from the top with titles "Front.11" and "Top.11", the third group of pieces of baggage (10) is completely inside the target AKH (2) at the end of step 5 of the present loading method.

Last in FIG. 2C, as shown by the two pictures in the bottom row with titles "Front.12" and "Top.12", the all three groups of pieces of baggage (10) are at their desired positions inside the target AKH (2) at the end of the example embodiment of the present loading method.

Figure 3:
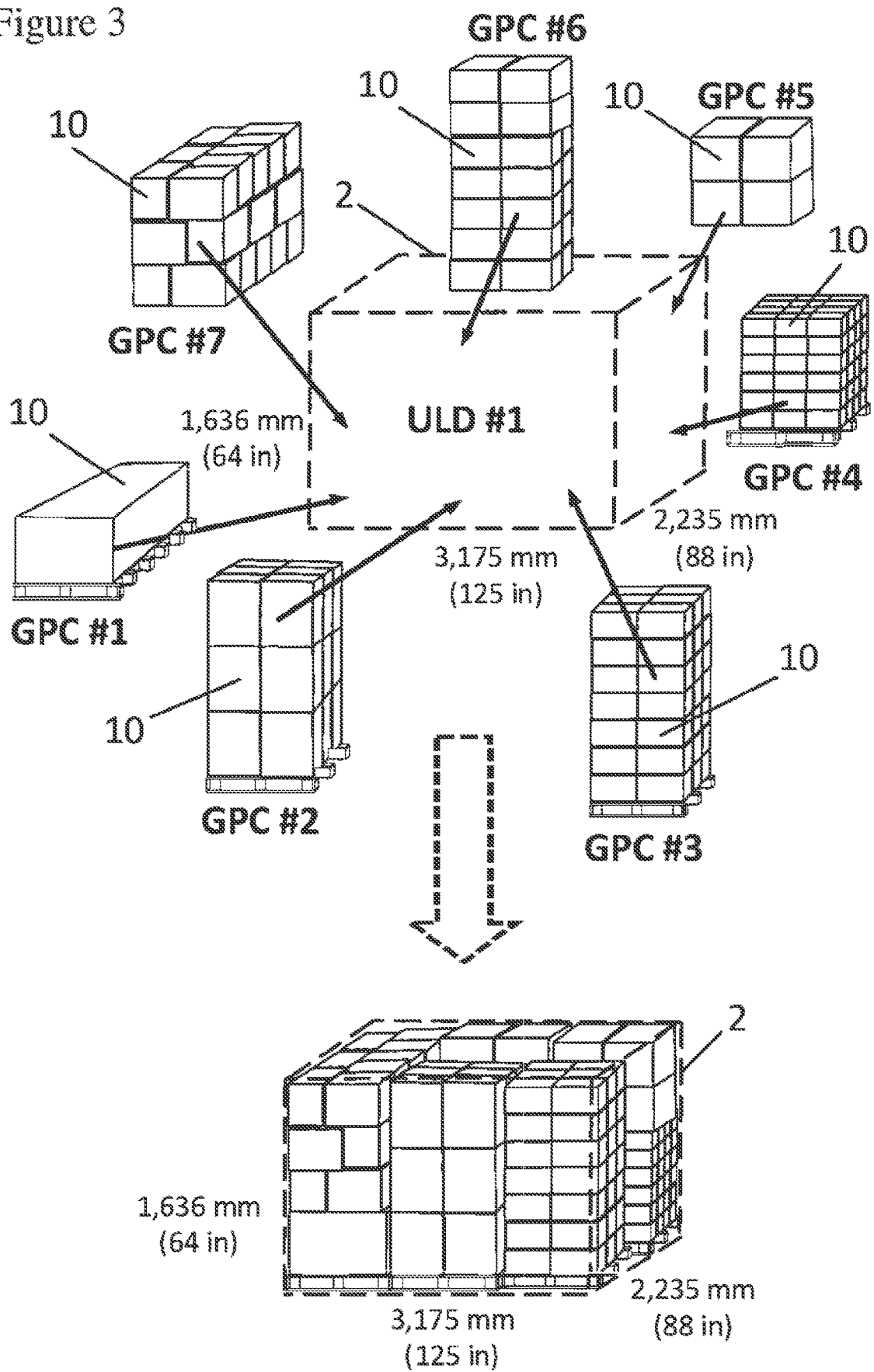
FIGS. 3, 4 and 5 present views to three example air transport unit load devices for wide-body aircrafts, as applying the method and process for automated preparation and consolidated loading of cargo on them, in accordance with at least some embodiments of the present invention.
Figure 4:
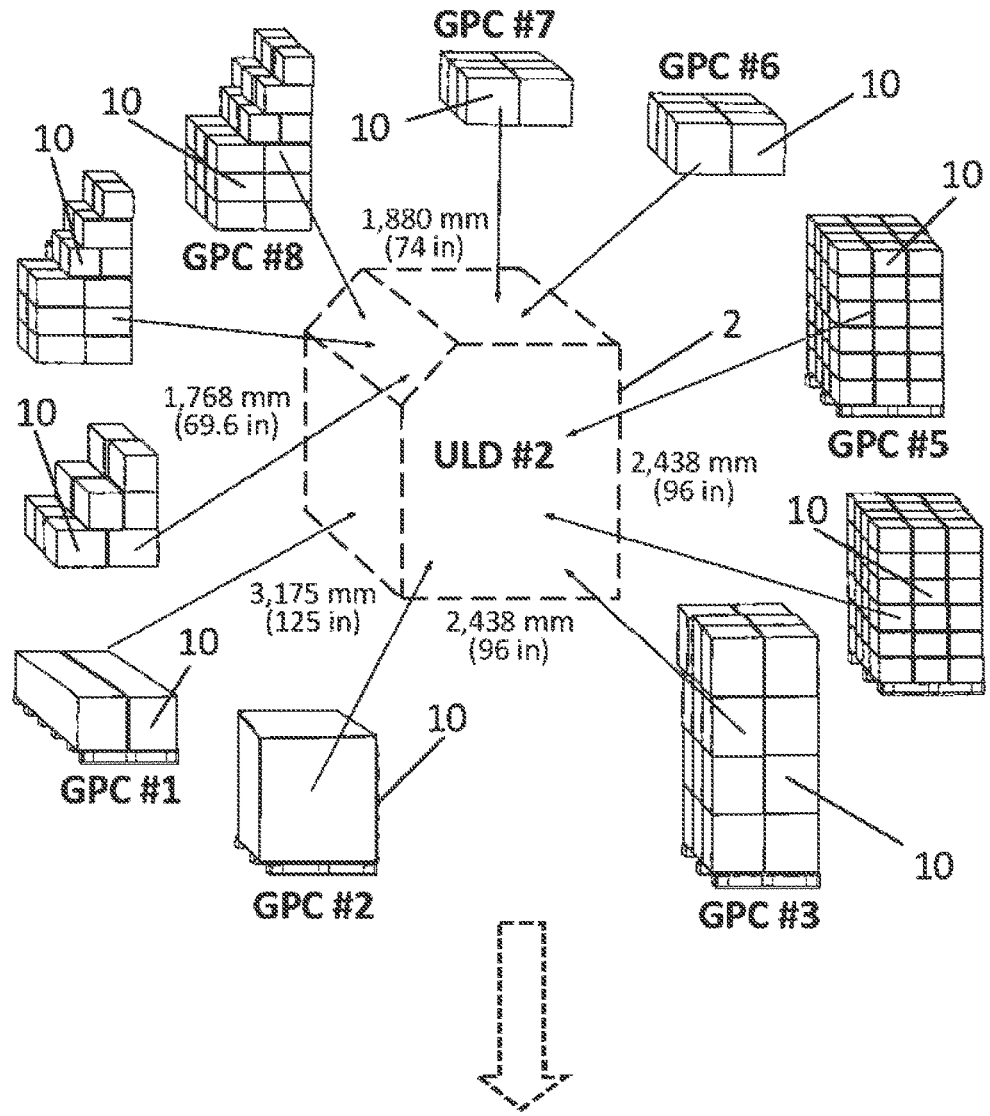
Figure 4:
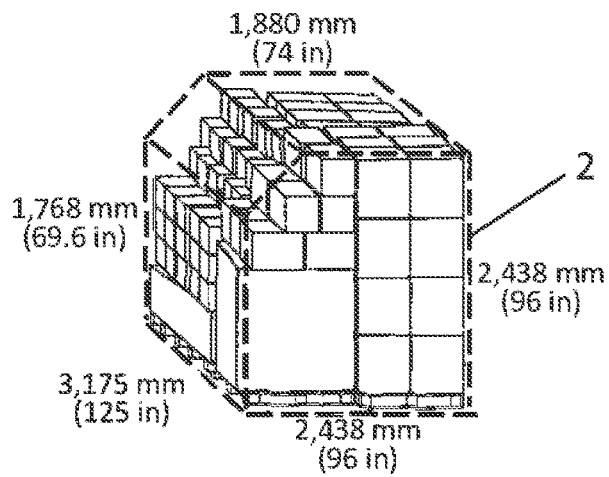
Figure 5:
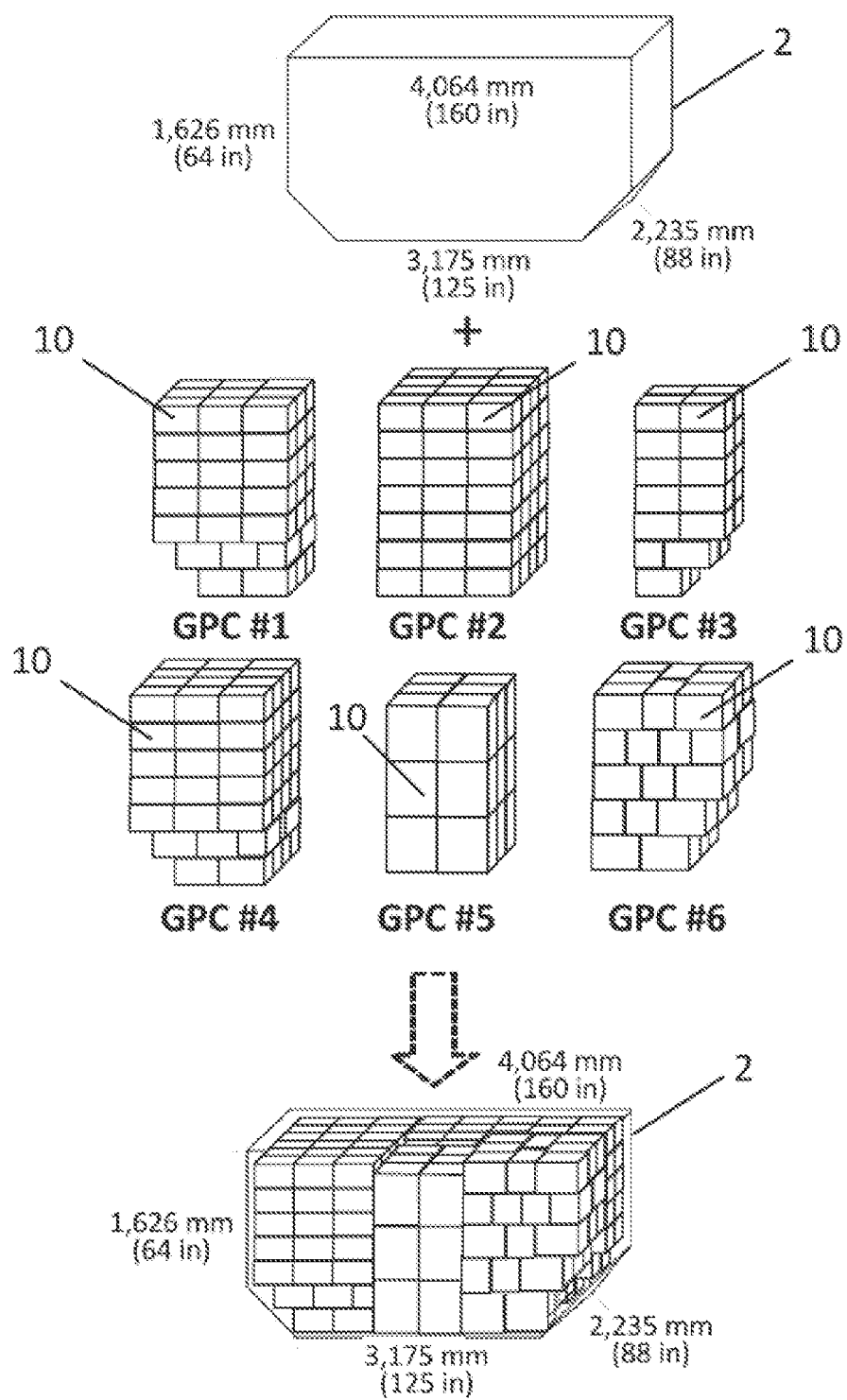

Referring to the step-wise method explained above in details utilizing the FIGS. 1A-1B and 2A-2C, three further examples in FIGS. 3 to 5 are provided to illustrate applying the consolidated ULD loading method to cargo handling.

FIG. 3 illustrates one embodiment of producing a lower-deck unit load device and FIGS. 4 and 5 embodiments of producing two variants of main-deck unit load devices, in order to transfer them to the next phase in the process.

Referring to captions in FIG. 3, GPC #1-GPC #7 refer to seven pre-built Groups of Piece-goods (GPG) as consolidated together conform to an example Simple Wide Body Lower Deck ULD Contour (caption ULD #1). It is to be noted that the Groups referred to as GPC #1-GPC #5 pre-built (consolidated, bundled) on a pallet, while Groups GCP #6-GPC #10 are pre-built (consolidated, bundled) without pallet.

Referring to captions in FIG. 4, GPC #1-GPC #10 refer to ten pre-built Groups of Piece-goods (GPG) as consolidated together conform to an example Wide Body Main Deck ULD Contour (caption ULD #1). It is to be noted that the Groups referred to as GPC #1-GPC #4 pre-built (consolidated, bundled) on a pallet, while Groups GCP #5-GPC #7 are pre-built (consolidated, bundled) without pallet.

Referring to captions in FIG. 5, GPC #1-GPC #6 refer to six pre-built Groups of Piece-goods (GPG) as consolidated together conform to an example Wide Body Lower Deck ULD Contour that is complying to the specification of the aircraft hull (caption ULD #3). It is to be noted that the Groups referred to as GPC #5 and GPC #6 pre-built (consolidated, bundled) on a pallet, while Groups GCP #1-GPC #4 are pre-built (consolidated, bundled) without pallet.

Referring to the step-wise method explained above in details utilizing the FIGS. 1A-1B and 2A-2C, three further embodiments are provided to illustrate applying the consolidated ULD loading method in two other example orientations: upside-down and sideways.

Figure 6A:
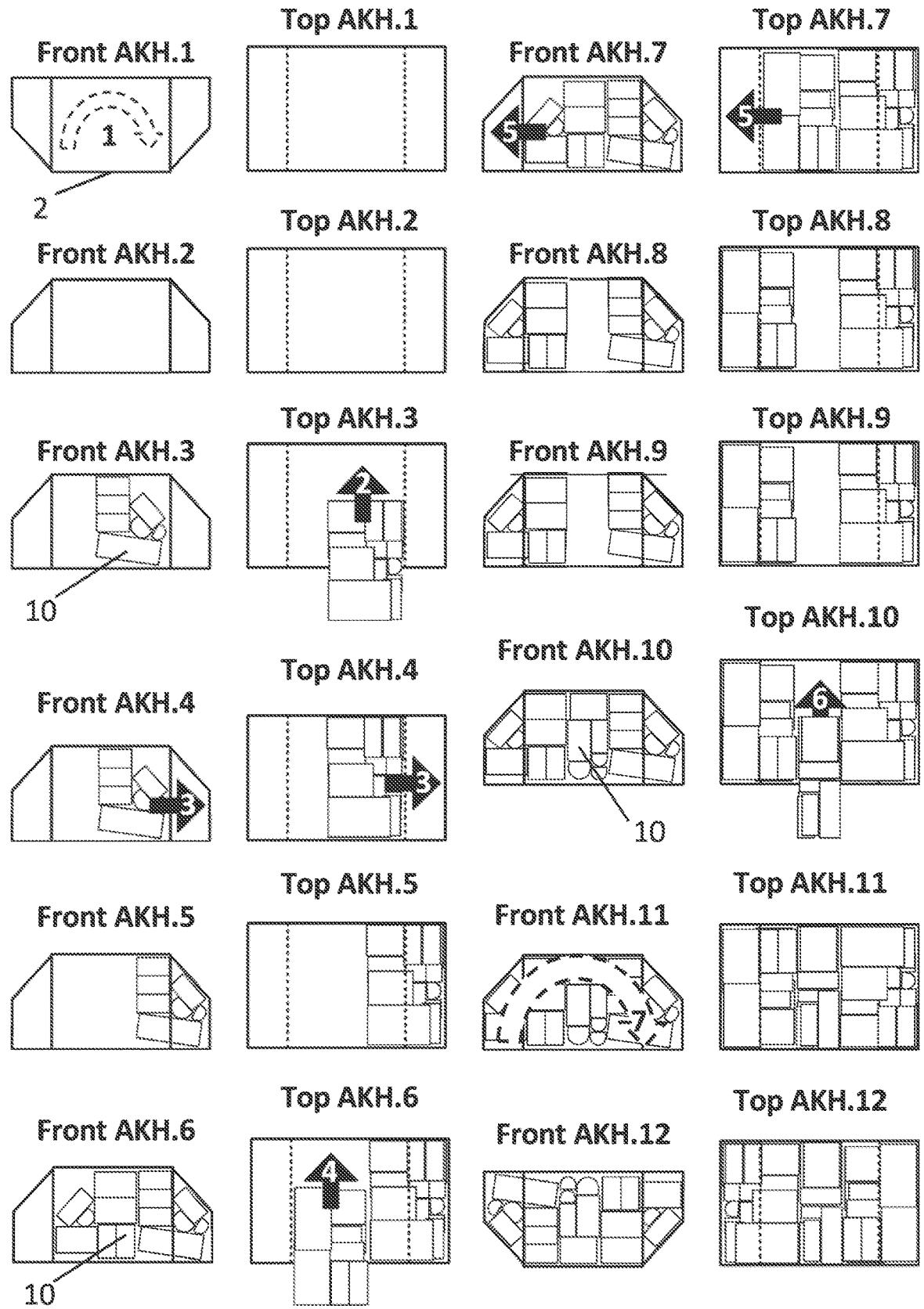
FIGS. 6A-6B present top and front (the side with the opening for loading) views to two main types of air transport unit load devices utilized in aviation, AKE and AKH, illustrating the applying of the method and process for automated preparation and consolidated loading of baggage in a specific upside-down orientation of these ULDs, in accordance with at least some embodiments of the present invention.
Figure 6B:
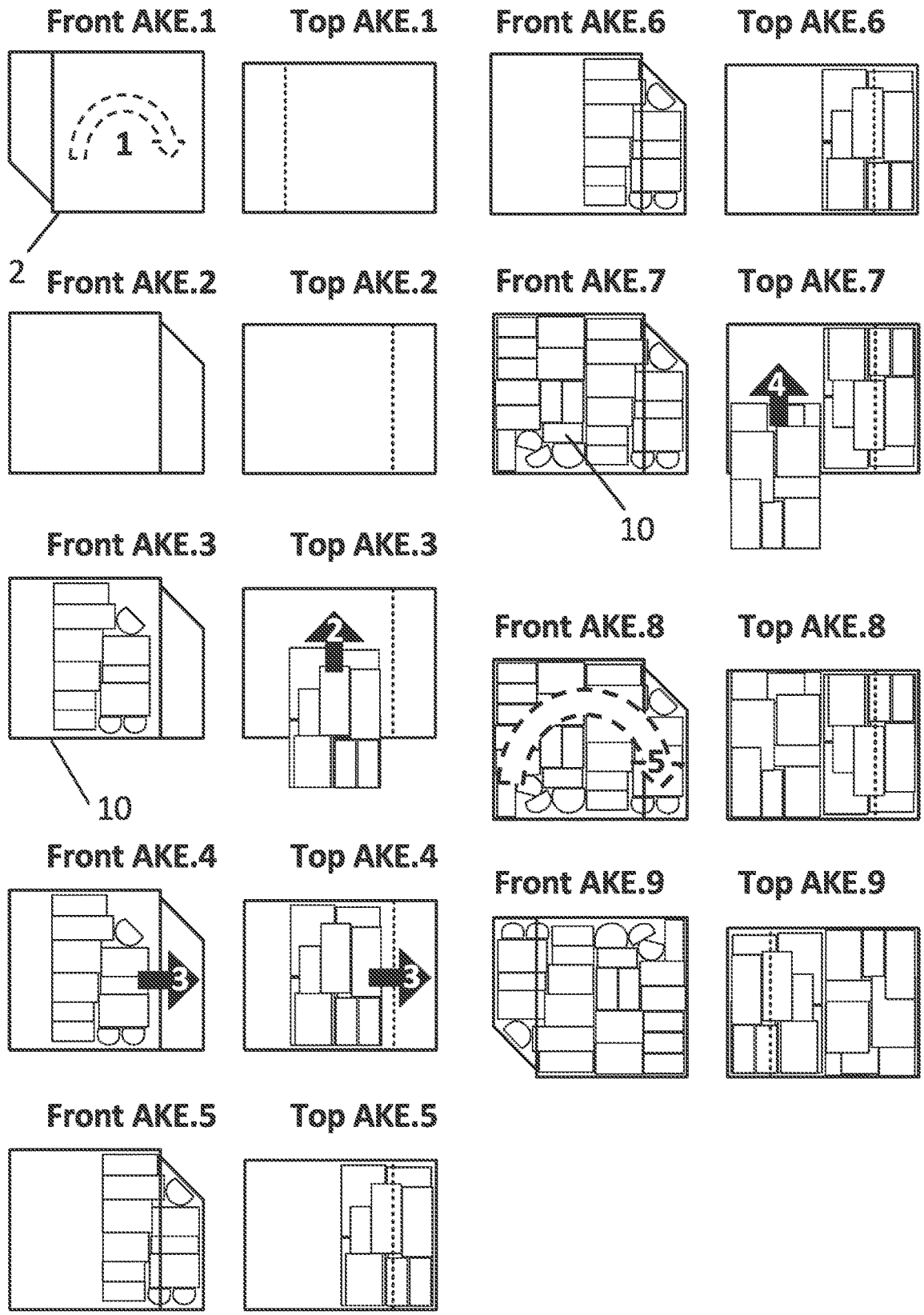

FIGS. 6A and 6B illustrate two example embodiments of loading the AKE and AKH air transfer containers in an upside-down orientation.

Figure 7:
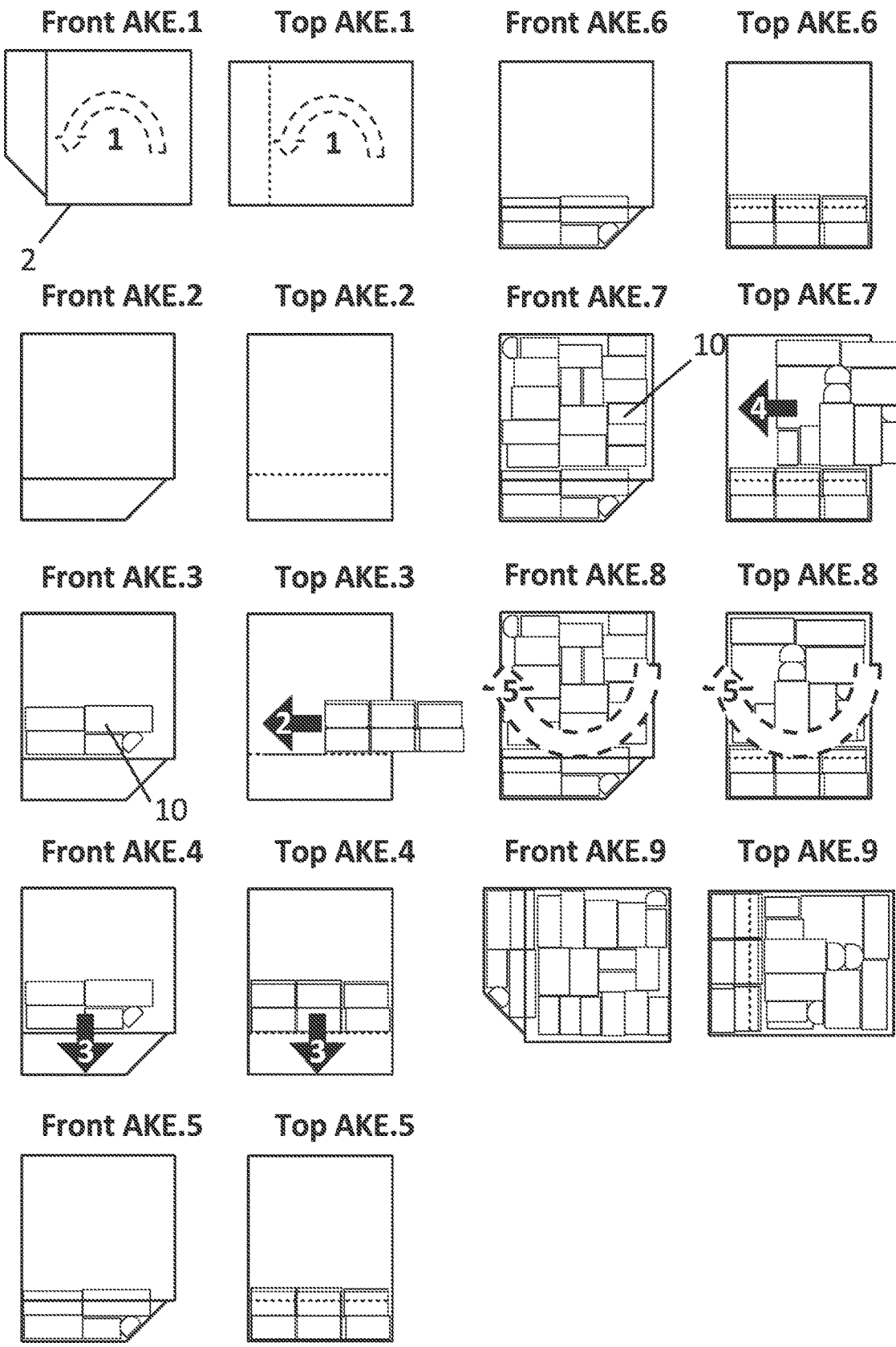
FIG. 7 presents top and front (the side with the opening for loading) views to AKE type of an air transport unit load device utilized in aviation, illustrating the applying of the method and process for automated preparation and consolidated loading of baggage in a specific sideways orientation, in accordance with at least some embodiments of the present invention.

FIG. 7 illustrates an example embodiment of loading the AKE air transfer container in a sideways orientation. It should be understood that other embodiments for applying the same method and process in any position and orientation are within the scope of the appended claims, and thus, these embodiments might be practiced other than as specifically described herein.

Figure 8:
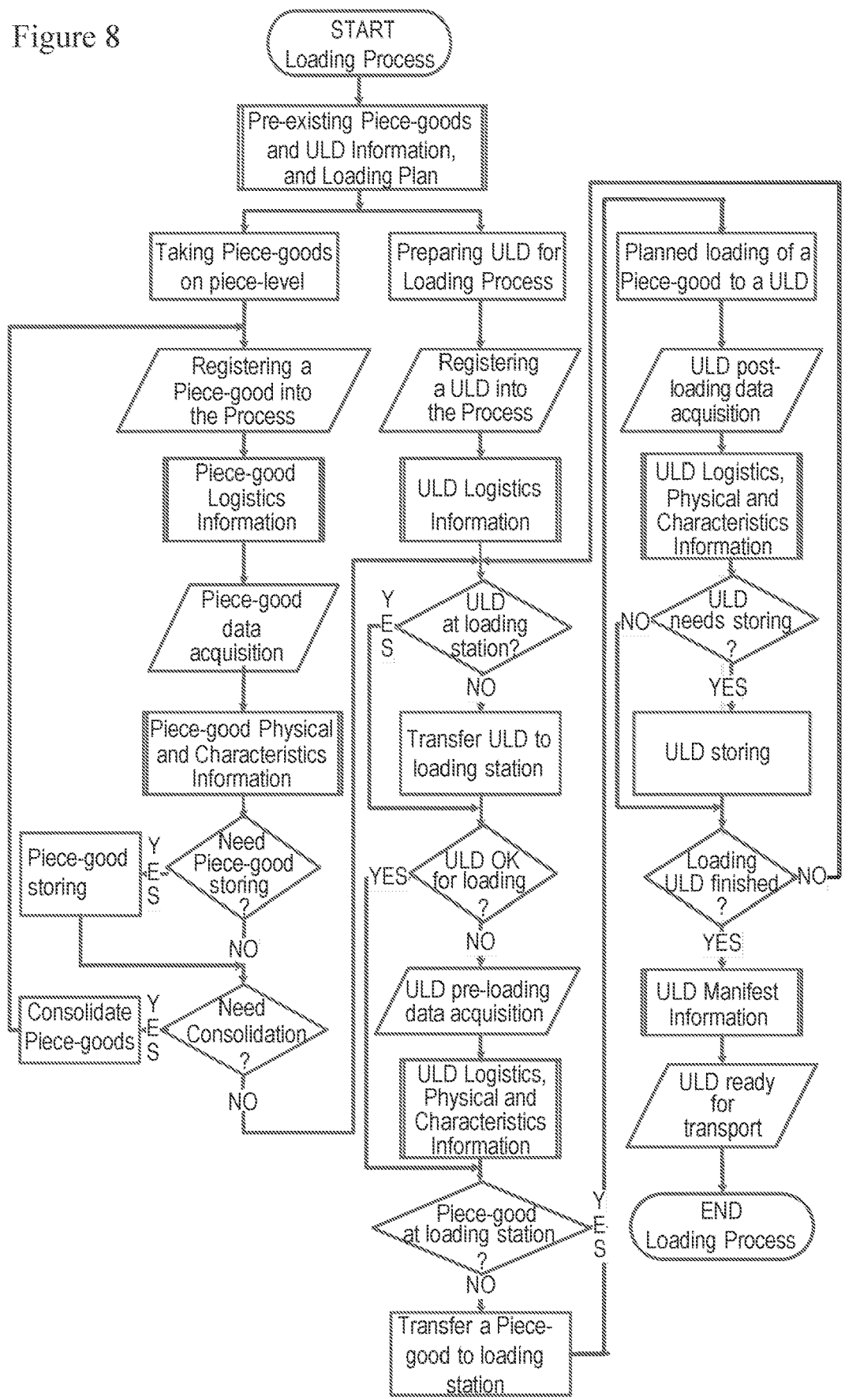
FIG. 8 presents the process architecture of the System for loading a plurality of items into a unit load device (2), in accordance with at least some embodiments of the present invention.

FIG. 8 presents one embodiment of the process for loading of ULDs with consolidated groups of piece-goods.

The System for consolidated loading of piece-goods into ULDs is illustrated in FIGS. 9-15 as a high-level of abstraction in order to emphasize the all the three key aspects of the innovation: 1) Consolidate a block of piece-goods (10) according to the shape and contour of the target free space within the ULD (2) this block is to optimally fit into, and simultaneously 2) Manipulate the orientation of the ULD (2) and 3) Manipulate the position and orientation of the Consolidate block of piece-goods (10), while loading the ULD (2) with the Consolidate block of piece-goods (10). More details on example embodiments of other components of the said System, as well as more examples of other embodiments of the said System itself, are given in the following figures.

Figure 9:
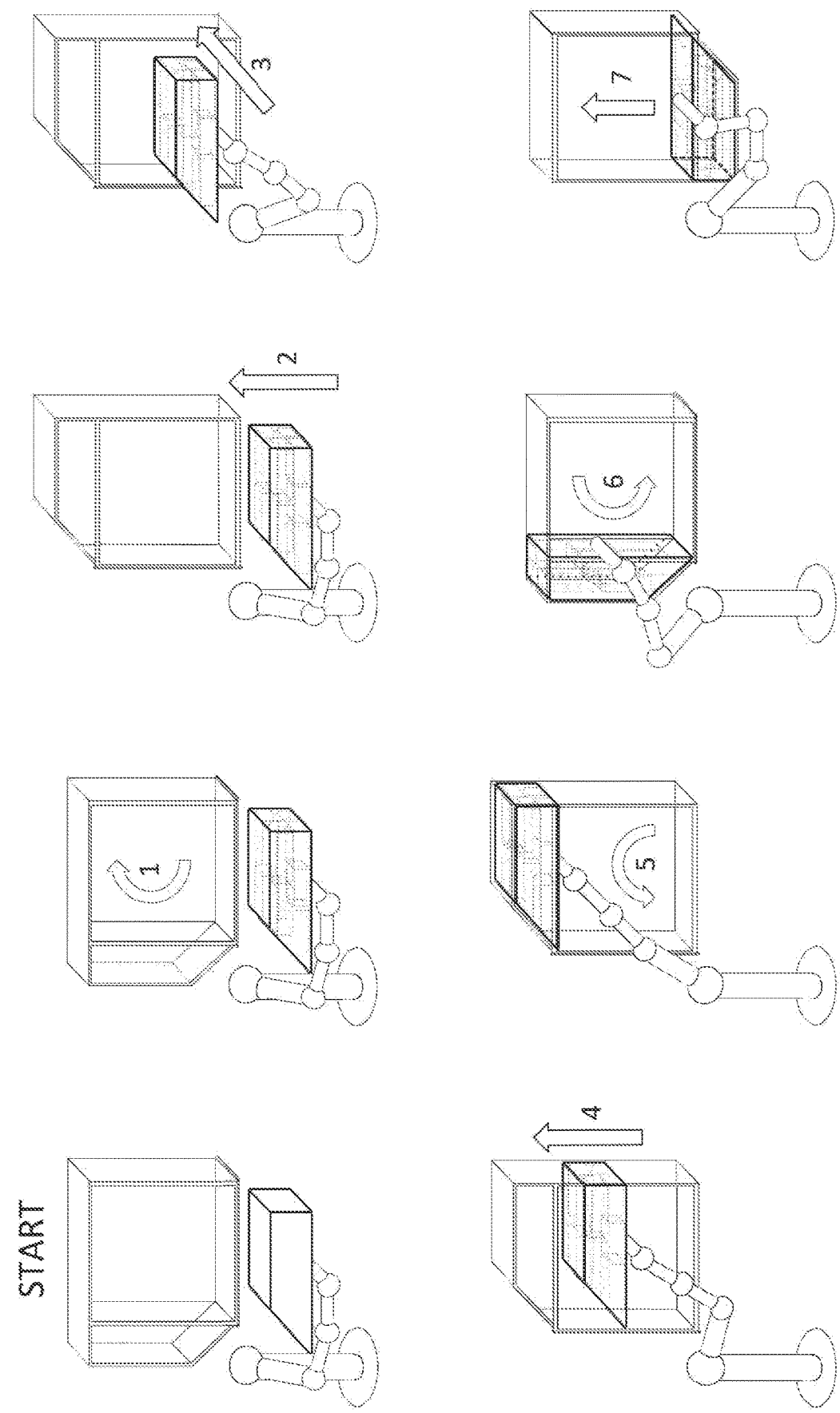

In the START phase of FIG. 9, an embodiment of the System is illustrated with a Gripper (501) type "Wing" that is open in the top and in the slanted part of it, but has walls in other three sides, and a bottom, as further illustrated in FIG. 18. This partially enclosed shape enables the Gripper (501) being loaded with a Consolidated block of piece-goods (10) prepared elsewhere or it being utilized as a "mold" into which a Consolidated block of piece-goods (10) will be built. The shape also enables moving the Gripper (501) from one place to another while keeping it in an orientation that supports the Consolidated block of piece-goods (10) from three sides, and thus greatly assists in keeping the piece-goods in a steady pile and maintaining its original shape and contour, as illustrated by the phases 1 to 5 of the FIG. 9.

Figure 10:
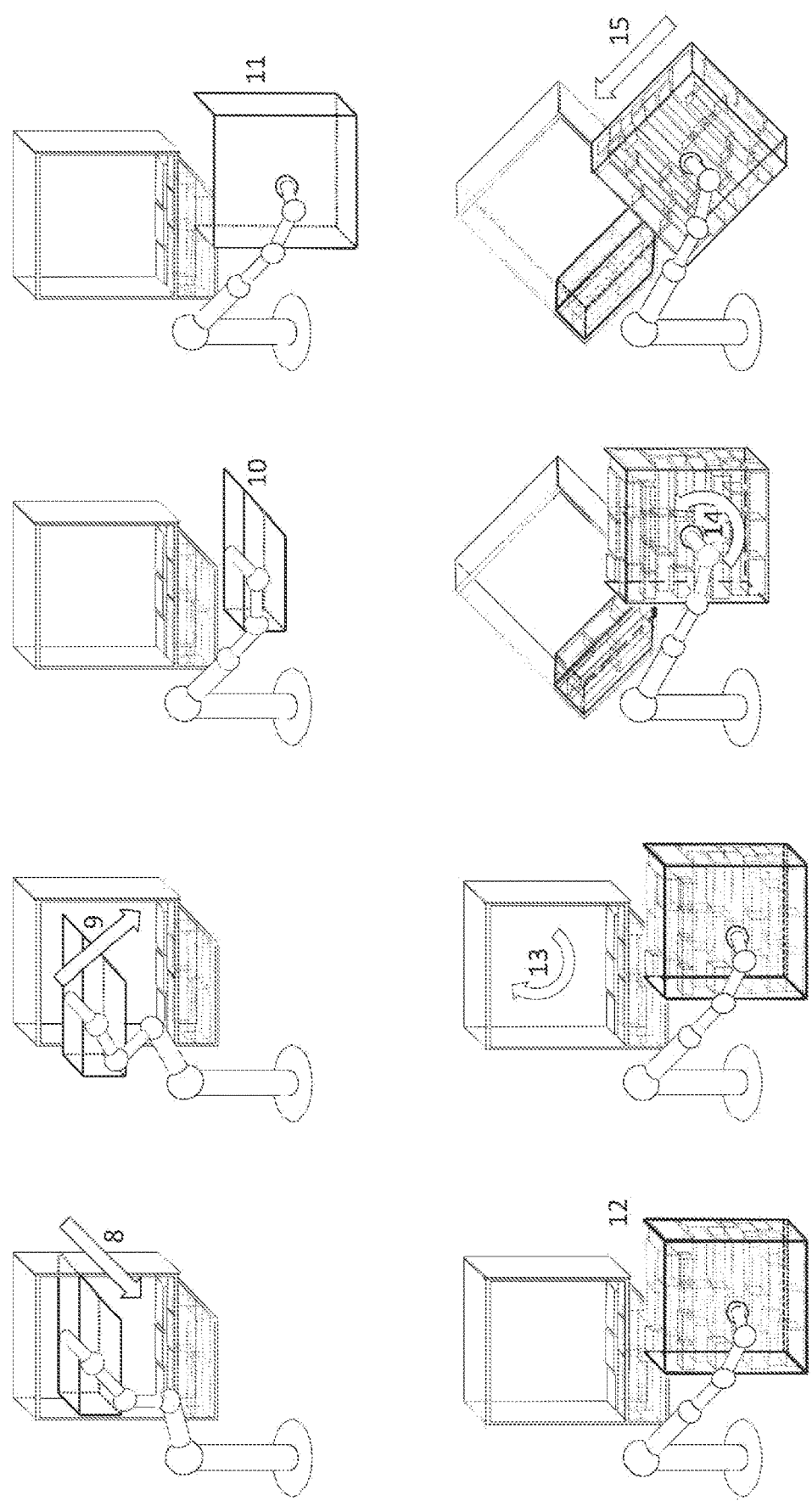

Another aspect of this embodiment of the type "Wing" Gripper (501) design is presented through the phases 7 to 9 of the FIGS. 9 and 10, where the Gripper (501) is kept in a bottom-up orientation while it is manipulated out of the ULD, and thus, at the same time enabling the Consolidated block of piece-goods (10) remain in place within the ULD (2).

The embodiment of the ULD Jig (502) design in FIG. 9 also illustrates one aspect of the present innovation that has to do with the type "Wing" Gripper (501) design: it ensures an easy access of the Gripper (501) into the "wing part" of the ULD (2) maintaining position and orientation that keeps the shape and contour of the consolidation and also ensures holding the piece-goods (1) in desired place within the "wing part" of the ULD (2) while rotating the ULD (2) using the ULD Jig (502) by 180°, which enables retrieving of the Gripper (501) as described above.

Figure 11:
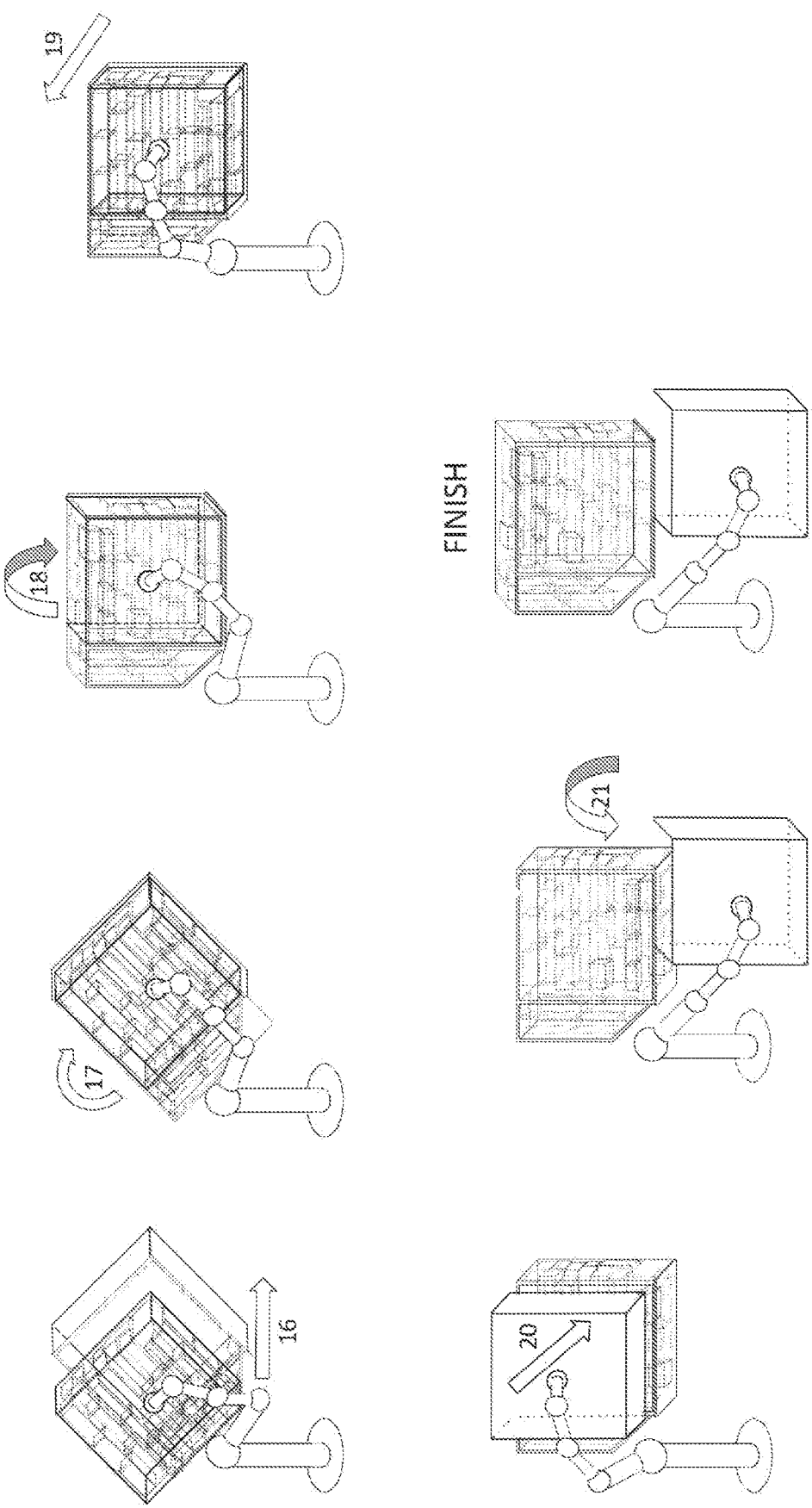
Figure 12:
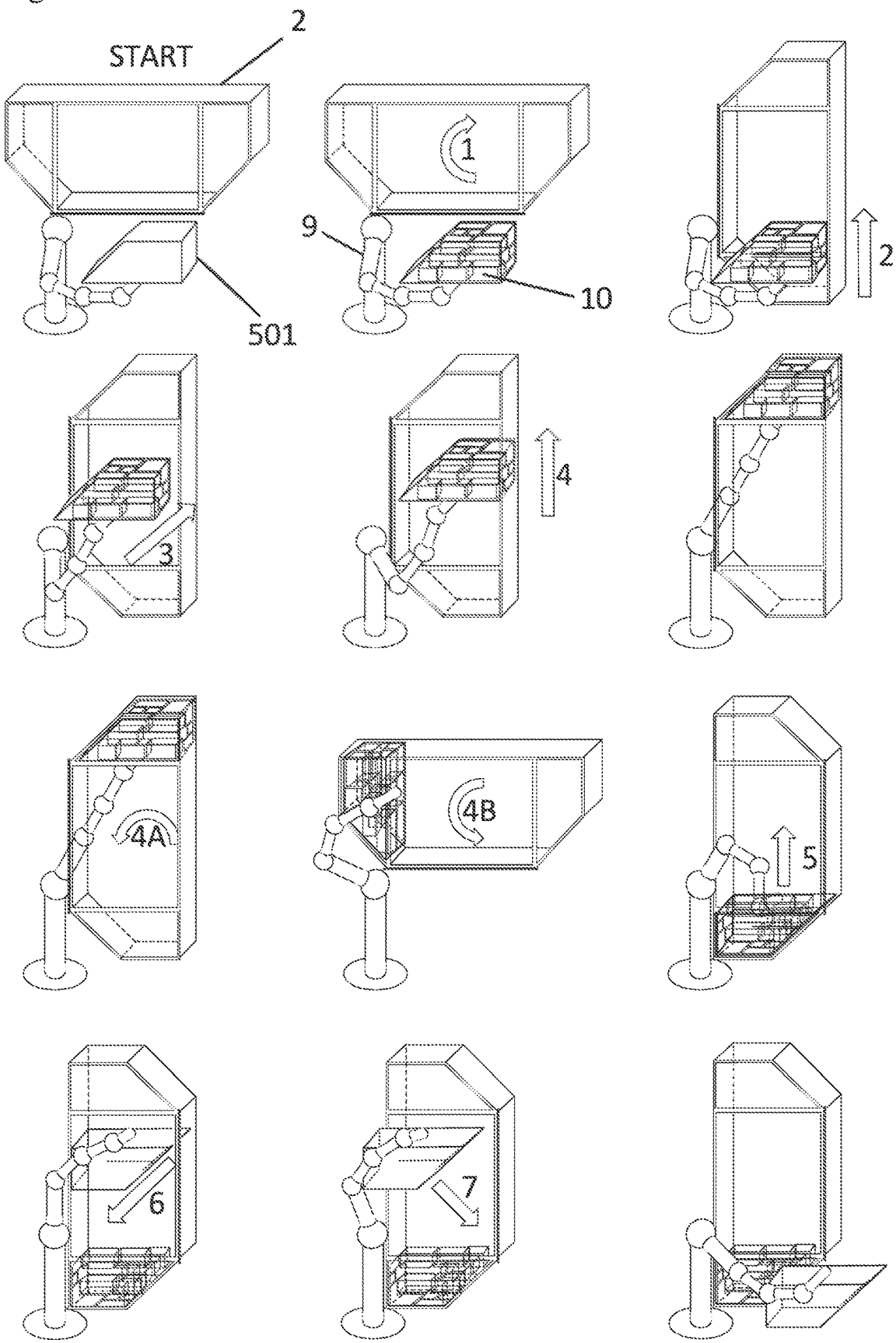

The phases 11 to 21 of the FIGS. 10 and 11 further illustrate the operation of the present System through the utilization of another embodiment of a Gripper (501), type "Block" that is open at the top and in one side as further illustrated in FIGS. 16-18, and the simultaneous rotation of the ULD Jig (502) that enables the Consolidated block of piece-goods (10) already positioned into the "wing part" of the ULD to remain in place while the type "Block" Gripper (501) with another Consolidated block of piece-goods (10) inside it is being manipulated into the remaining free space inside the ULD. Analogically to the operation of the System for retracting the type "Wing" Gripper (501) from inside the ULD, the type "Block" Gripper (501) can also be retrieved while enabling the Consolidated block of piece-goods it delivered into the ULD maintaining its shape and contour, as the ULD is first tilted backwards (a rotation known as pitch) using the ULD Jig (502) which allows gravity to support the piece-goods in place by leaning against the back of the ULD while the type "Block" Gripper (501) is retrieved by pulling it out while keeping it in an aligned orientation so as to minimize the friction between it and the piece-goods.

The FIGS. 12 to 15 illustrate another embodiment of the present System applied to the other main type of ULDs widely in use in aviation, an AKH container, that consists of two "wing" parts, making the loading of Consolidated blocks of piece-goods more complex than previously shown regarding the AKE type ULD. In the phases up until phase 8 of the FIG. 13, the System operates as with the AKE example, after which in between phases 9 to 25 illustrated in the FIGS. 13 to 15, due to the existence of the other "wing" part of the AKH, a specific Gripper (501) type "Wall" is utilized to hold the piece-goods already placed in the first "wing" part in their desired positions. While keeping the ULD in a backward-tilted orientation (rotation know as pitch) that utilizes the assistance of gravity in the holding of the piece-goods in positions that maintain the shape and structure of the entire pile of piece-goods loaded into the ULD, the "Wall" type Gripper (501) described in more detail in context of the FIGS. 20-22, can be removed by the System, as illustrated in the phases 26 to 28 of FIG. 15.

Figure 13:
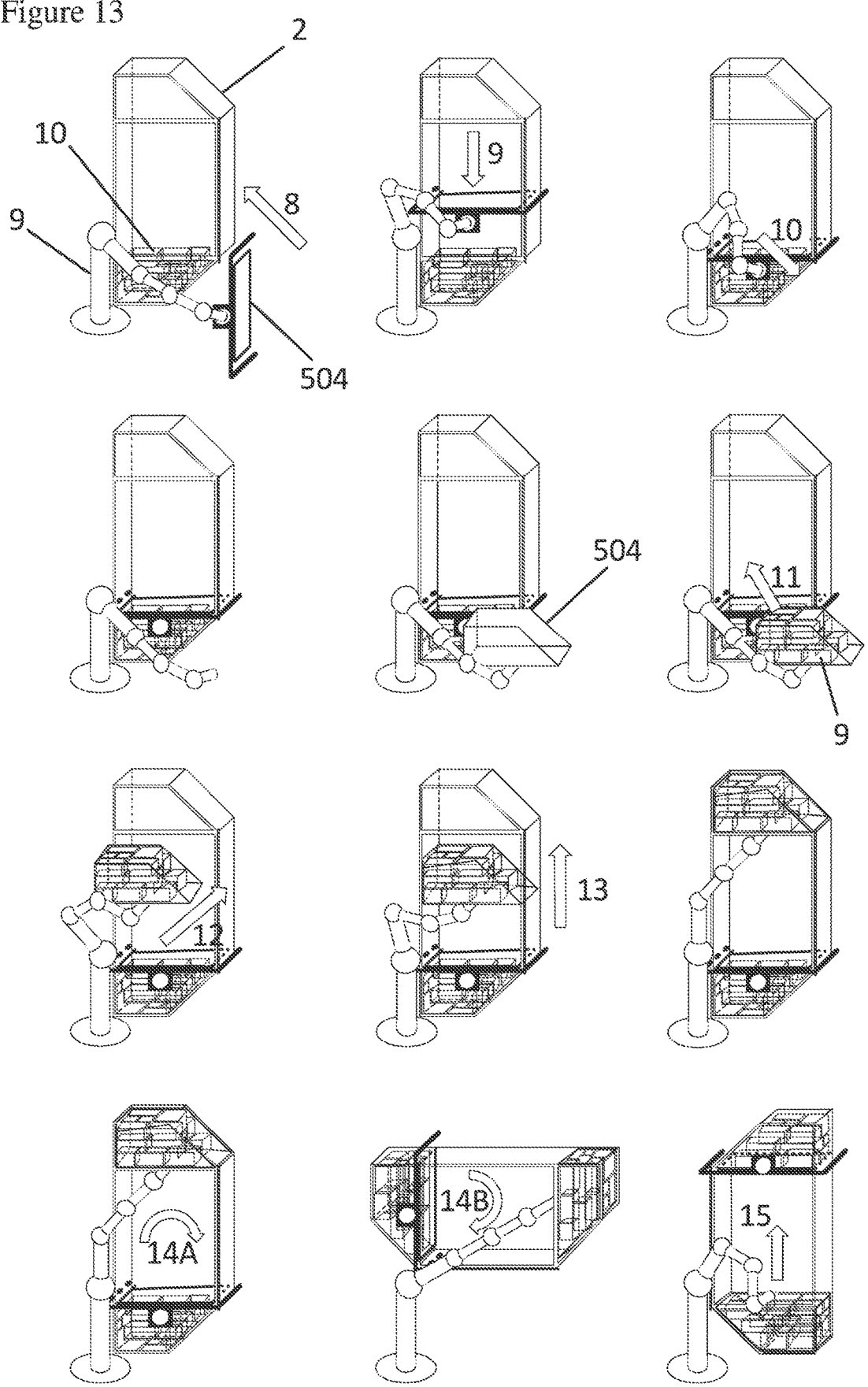
Figure 14:
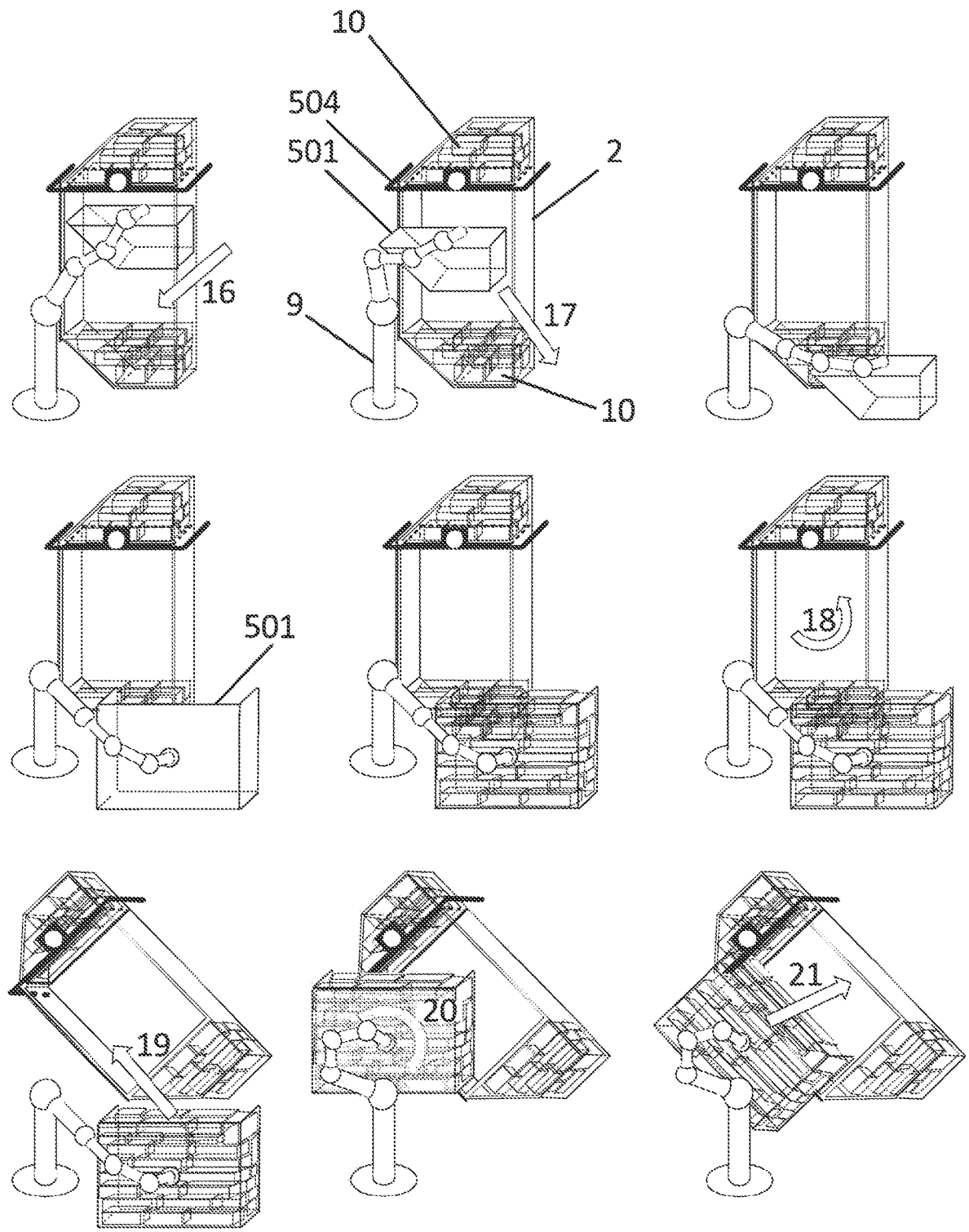

As illustrated in phases 11 to 17 of FIGS. 13 and 14, in one embodiment of the System the same type "Wing" Gripper (501) can be utilized for loading of both "wing" parts of an AKH type container, by means of rotating it 180 degrees around the vertical axis (yaw).

Figure 15:
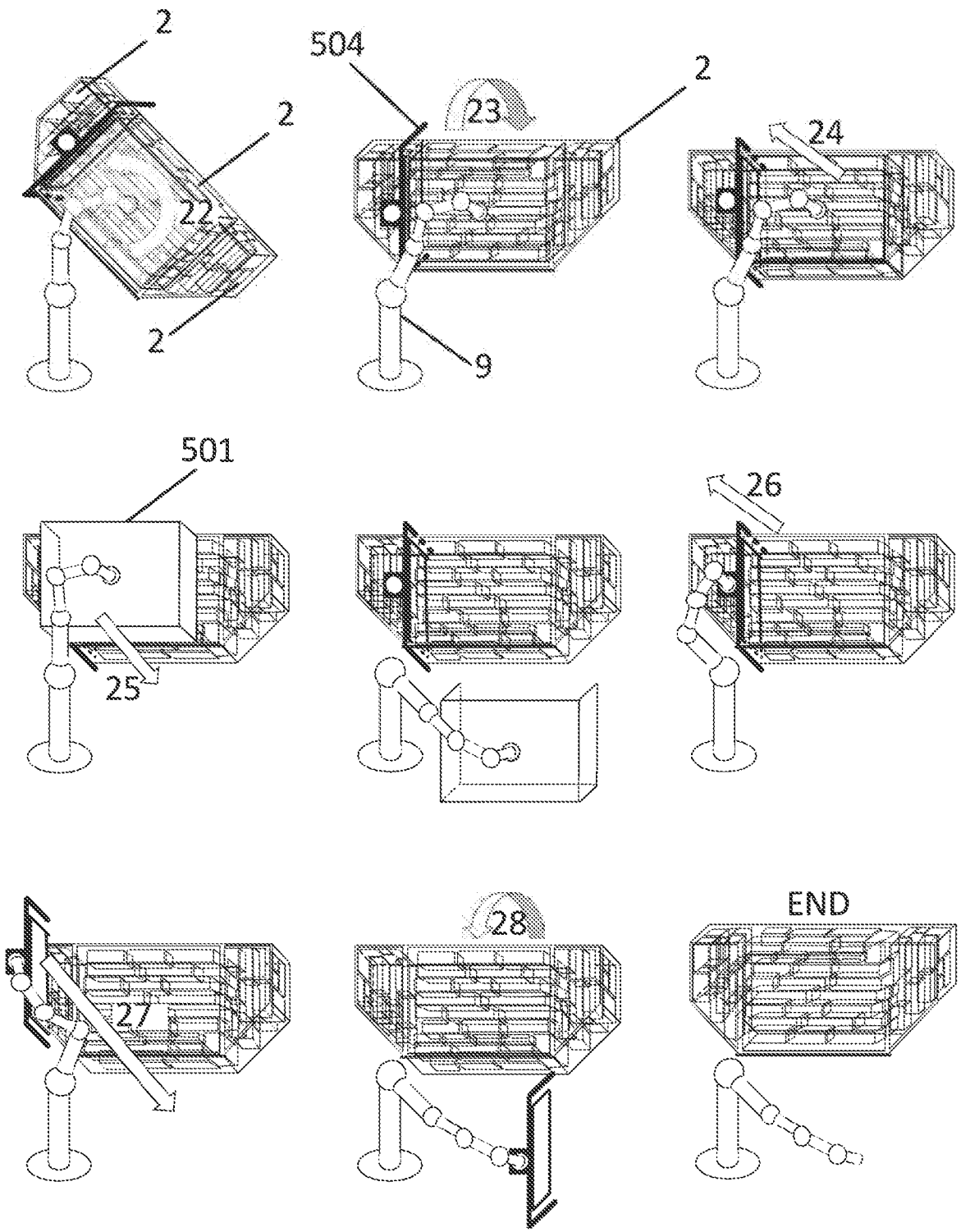

In another embodiment not illustrated here, a System utilizing two type "Wing" Grippers (501) can be implemented, which enables the phases 19 to 22 of FIGS. 14 and 15 to be carried out keeping the ULD in a horizontal orientation (with respect to rotation know as roll).

Following the illustrations in FIGS. 16-18 on the presented embodiments that cover higher-level views to both stationary Grippers (501) and Grippers (501) with embedded mechanisms for adjusting the position of their side and bottom structures, the latter embodiments enabling the adjustment of the Gripper (501) to reflect the shape and contour of the free space within the ULD (2) that the Consolidated block of piece-goods (10) is intended to fit into, different variants of Grippers (501) implementing none, one, or several functions, including but not limited to the ones presented here, assisting and/or required in the intended use of the Grippers (501) can be designed by those in the art, also considering all other technologies and solutions commonly utilized in Grippers (501) designed for loading of piece-goods, and for example utilization of (vacuum) suction, electro adhesion, various means for enhancing friction, compression, to name a few ways for increasing the quality and efficiency of the loading System.

FIG. 17 illustrates two of the possible embodiments to consolidate piece-goods (1) using a specific Gripper (501). Phase A and B in FIG. 17 illustrate the process of transferring the already consolidated group of piece-goods (10) into a Gripper (501) and phases C and D in FIG. 17 illustrate another process where the Gripper (501) is directly utilized in the phase of consolidating the piece-goods (1) into a group of piece-goods (10).

FIG. 18 illustrates a possible embodiment to consolidate piece-goods (1) using a specific Gripper (501) with adjustable side wall(s) and/or bottom. Comparing phases A and B of the FIG. 18 the width adjustment of a Gripper (501) can be understood by one in the art. Similarly, comparing phases A and C of the FIG. 18 illustrates length-wise adjustment of the Gripper (501), and comparing phases A and D of the FIG. 18 illustrates an embodiment of the Gripper (501) with modifiable volume and shape through its adjustable walls and bottom.

FIG. 19 presents views to a more detailed embodiment of the Gripper (501) type "Wall" that consist of two components: a Wall element (504) that supports the piece-goods (1) inside the ULD (2) during the loading process as illustrated in FIGS. 12-15 and its counterpart, a Wall adjustment element (505) with two functions enabling the adjustment of the position of the Wall element (504) inside a ULD and fixing it to the desired position. The Wall adjustment element (505) is embedded into the System component ULD Platform (506), as illustrated through FIGS. 19-21.

FIG. 20 illustrates the present System through a series of phases in the process of installing one embodiment of Wall element (504) into the Wall adjustment element (505) while having an AKH type container (2) on the ULD Platform (506). In phase A of the FIG. 20, Wall element (504) is in line with an AKH container on a platform with an embedded Wall adjustment element (505). In phase B of the FIG. 20, Wall element (504) is entering an AKH. In phase C of the FIG. 20, Wall element (504) is in position enabling adjusting its position utilizing the mechanism of the embedded Wall adjustment element (505). In phase D of the FIG. 20, Wall element (504) is locked in position by the peg-and-hole mechanism (509) of the Wall adjustment element (505).

FIG. 21 illustrates in more detail an embodiment of the present design that utilizes two position sensors for detecting the correct alignment of the Wall element (504) within the Wall adjustment element (505) enabling 1) the adjustment of the position of the Wall element (504) inside the ULD (2) to optimally hold the Consolidated piece-goods (10) within the "wing" part of the ULD (2) and 2) locking the Wall element (504) in place by inserting it as far into the Wall adjustment element (505) as possible, and thus pushing the peg at the tip of the support rod part of the Wall element (504) into one of the line of holes made in its counterpart fixed to the ULD Platform (506). In phase A of the FIG. 21, the lower part of the Wall element (504) is in line with an AKH container on a platform with an embedded Wall adjustment element (505). In phase B of the FIG. 21, the lower part of the Wall element (504) has entered an AKH. In sub-phase C1 of the FIG. 21, the lower part of the Wall element (504) is in a position enabling detecting its exact position for example utilizing known technology and methods, such as sensors and/or aligning markers and/or switches/pegs/holes, while the sub-phase C2 of the FIG. 21 with its example embodiment of a mechanical locking mechanism, peg-in-the-hole (509), ensures stable engagement and locking of position of the Wall element (504) with respect to the Wall adjustment element (505).

All the illustrations in FIGS. 19-21 are according but not limited to the presented embodiments.

Figure 22:
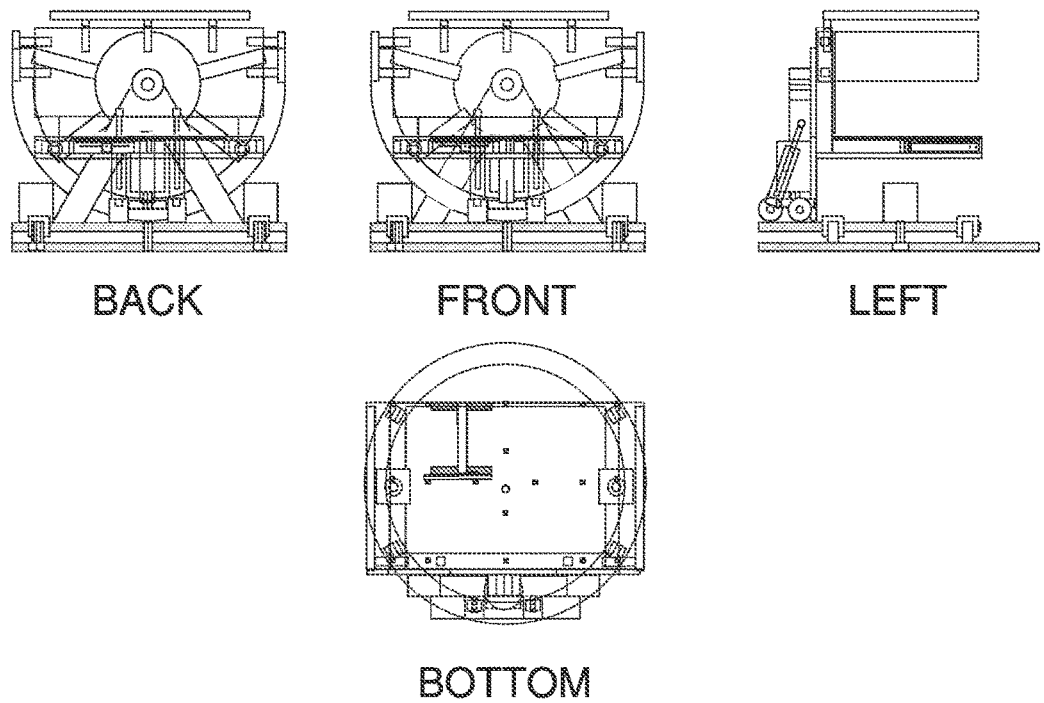

FIG. 22 presents back, front, left and bottom views to a ULD Jig (502) designed for manipulating an AKH type of an air transport unit load device (2) utilized in aviation as part of a System applying the method and process for consolidated loading of piece-goods, according but not limited to the presented embodiment that can be added more degrees of freedom, such as linear motion along the vertical axis (yaw) for lowering and raising the entire ULD Platform (506) including the mechanism implementing the rotation around roll relatively to the body of the ULD Jig (502) that implements the rotations around yaw and pitch. The present ULD Jig (502) can manipulate an AKH type container (2) in three degrees of freedom, around the rotations of the main axes of the ULD Jig (502), more generally also known as roll, pitch and yaw. In the present embodiment of the ULD Jig (502), the AKH type container (2) will be fixed in the initial position and orientation prior to its manipulation using the ULD Platform (506) as a base, and the adjustable supporting Side elements (507) and the Top element (508) that create the mechanical forces required for maintaining both the shape of the ULD (2) as well as its position and orientation relative to their initial ones throughout the operation of the System.

Figure 23:
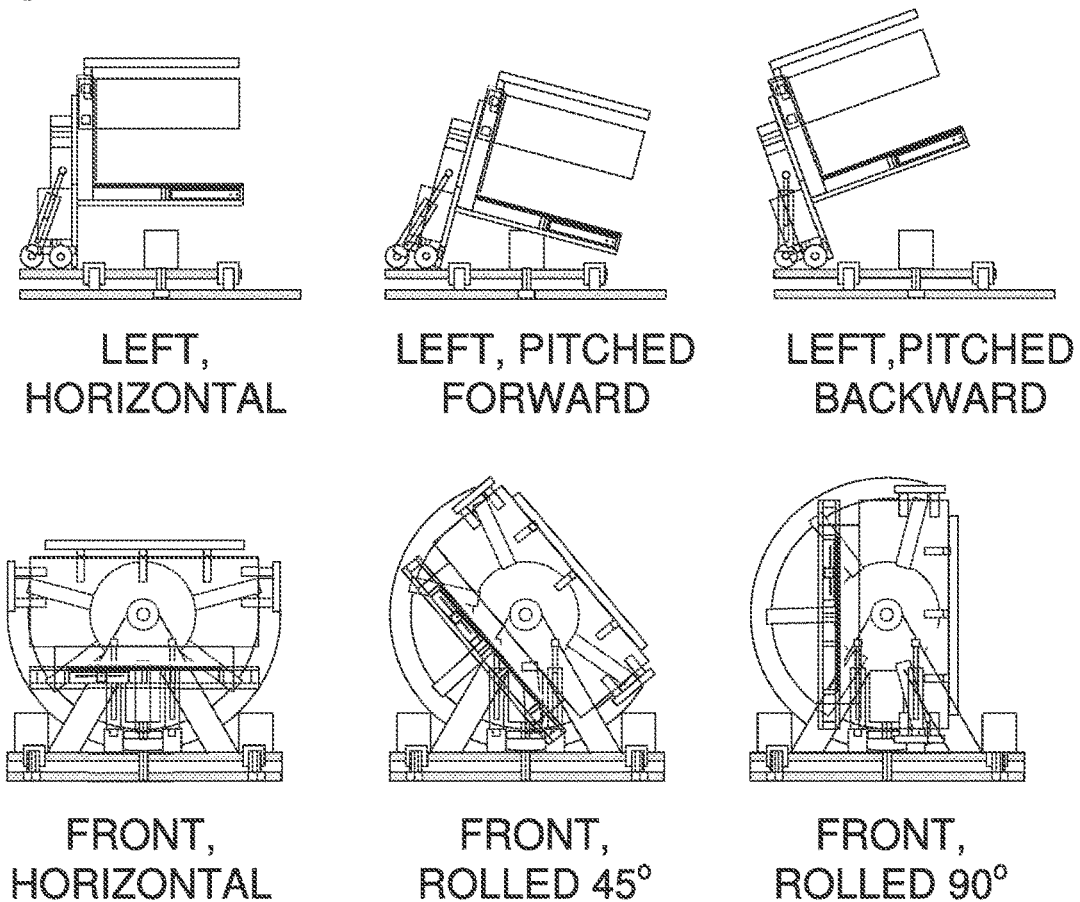

FIG. 23 presents an example set of six of all the possible orientations of a ULD Jig (502) around two of the three rotations this embodiment of a ULD Jig (502) enables (pitch and roll).

Figure 24:
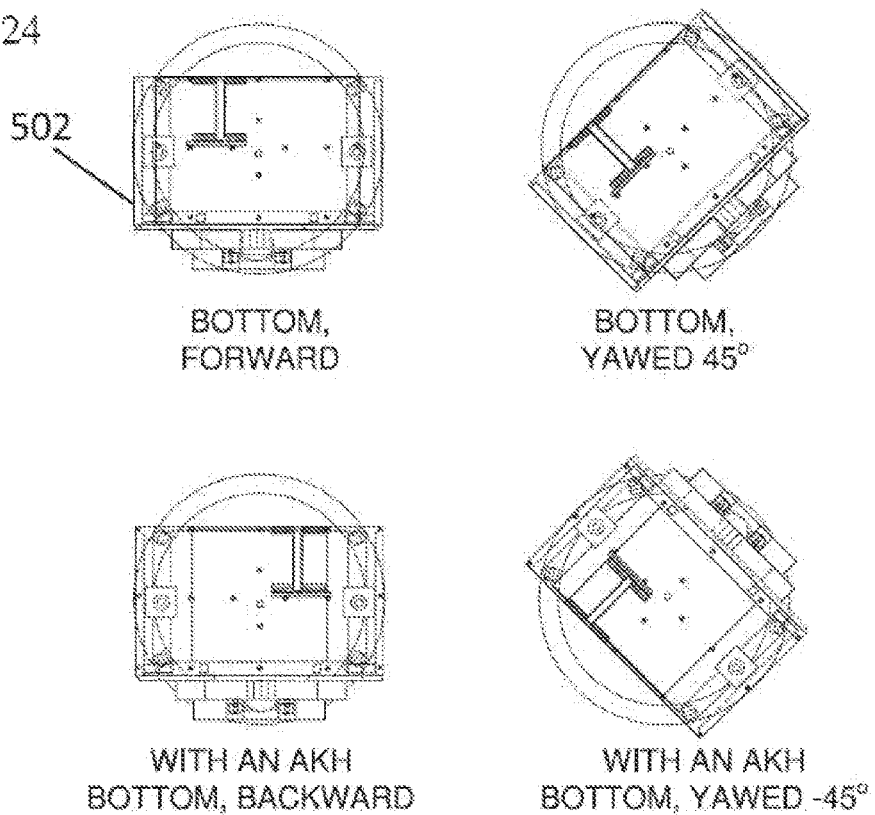

FIG. 24 presents an example set of four of all the possible orientations of a ULD Jig (502) around a rotation (yaw), as seen from bottom view.

Figure 25:
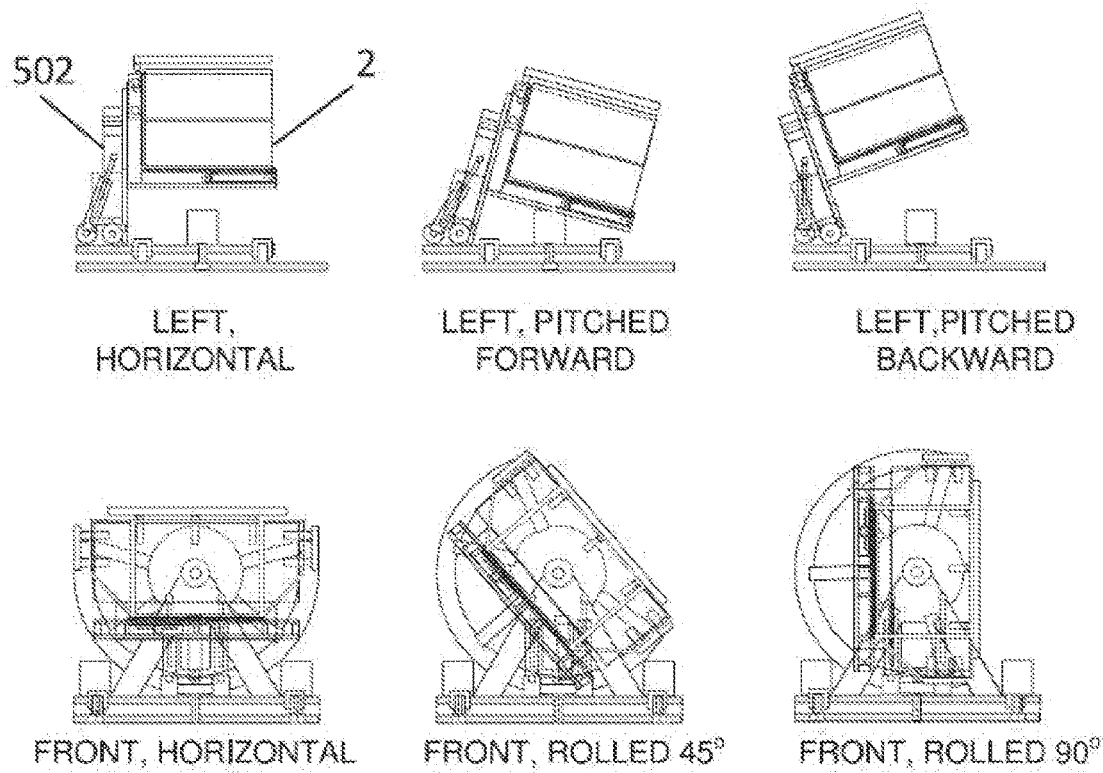

FIG. 25 presents left and front views to an AKH container (2) placed on a ULD Platform (506) of a ULD Jig (502), each of these six example illustrations representing one possible orientation around two of the three rotations this embodiment of ULD Jig (502) enables (pitch and roll).

FIG. 26 presents an embodiment of a set-up implementing the consolidation phase of a System for loading of consolidated piece-goods into ULDs. In this embodiment that presents a vertical configuration of a Consolidation Station (410) with some of its preceding and following System components, the piece-goods (1) are delivered to the Consolidation Station (410) from the top, where the palletizing function is performed in conjunction with the function of vertical manipulation of the already consolidated piece-goods (1), in order to produce a block of piece-goods (10) either into a Consolidation mold (500) or directly into a specific Gripper (501) for a loading manipulator to pick up from the bottom of the Consolidation Station (410) as one item, which is the essence of the entire method and the embodiment of the present System, according but not limited to the present embodiments.

In one embodiment of the Consolidation Station (410) illustrated in FIG. 26, there are six phases A to F described as follows. In phase A of the FIG. 26, piece-goods (1) arrive to the Pre-palletizing Sub-system (602) of the Consolidation Process implemented by the Consolidation Station (410). In phase B of the FIG. 26, piece-goods (1) are palletized layer-by-layer, yielding a group of piece-goods (10). In phase C of the FIG. 26, and before transfer to the phase D of the same figure, the consolidated group of piece-goods (10) can be bound, or tied together in a bundle using various means known in the art of automated logistics or distribution warehouses, resulting in an enclosed group of piece-goods (11), with or without a loading pallet. Otherwise according to FIG. 26, the group of piece-goods (10) transferred in phase C to phase D, during the latter of which the consolidated group of piece-goods (10) is ready to be picked up by the loading manipulator (9). In one embodiment of the phases B to D, the consolidation can take place directly into a specialized type of a Gripper (501) referred to as Consolidation mould (500) illustrated in FIG. 8. Phase E of FIG. 26, picking up the group of piece-goods (10), is carried out by a Loading manipulator (9) that during the following phase F is able to position and orient itself as required for loading the group of piece-goods (10) into the ULD (2).

FIG. 27 presents an embodiment of a set-up implementing the phase of loading into ULDs of a System for loading of consolidated piece-goods into ULDs. In this embodiment that presents a loading manipulator (9) connected with a type "Block" Gripper (501) with a Consolidated block of piece-goods (10) inside it entering a ULD (2) on a ULD Jig (502), the piece-goods (1) are delivered into their final position and orientation within an AKE type of a ULD (2) by simultaneously manipulating both the ULD Jig (502) and the loading manipulator (9), which enables and ensures the piece-goods (1) transferring from the Gripper (501) into the ULD (2) maintaining their position and orientation within the consolidated block of piece-goods (10), which is the core of the entire method and the embodiment of the present System, according but not limited to the present embodiments.

In one embodiment of the ULD Loading Station (400) illustrated in FIG. 27, there are three system components A to C, with characteristics and functions described as follows. Reference A of the FIG. 27, illustrates a ULD Jig (502) that is able to manipulate an ULD (2) in synchrony with the Loading manipulator (9) while loading the group of piece-goods (10) into the ULD (2). Reference B of the FIG. 27, illustrates and emphasizes the interfacing between the end of the Loading manipulator (9) arm and the Gripper (501) that is known in the art as a Quick-mount adaptor (503). Reference C of the FIG. 27 illustrates one embodiment of the Loading manipulator (9), a multi-degree-of-freedom industrial robot.

FIGS. 28 and 29 present several views into an embodiment of a configuration implementing a System for loading of consolidated piece-goods into ULDs. In this embodiment the piece-goods (1) are delivered to the System from a preceding overall process phase by a conveyor that forwards them to a system-internal conveyor buffer that also serves as a re-circulation and re-sequencing loop prior to forwarding the piece-goods into the Consolidation Station (410) from the top level. Once the Consolidated block of piece-goods (10) has been prepared by the Consolidation Station (410), it can be picked up from the bottom level by a loading manipulator (9). The present embodiment can operate either based on the Consolidated block of piece-goods (10) waiting for transfer into an empty Gripper (501) the loading manipulator (9) is holding at the end of its arm or, the consolidation can be made directly into a Gripper (501) that is manipulated by the Consolidation Station (410), in the latter case of which the loading manipulator (9) picks it up with the aid of the quick-mount connector at the end of its arm. All the illustrations in FIGS. 28 and 29 are according but not limited to the present embodiments In one embodiment of the System for loading of consolidated piece-goods into ULDs illustrated in FIG. 29, there are eleven system components and/or process phases A to K, with characteristics and functions described as follows. Reference A of the FIG. 29 illustrates a part of an external system (5) known in the art as Sorter Conveyor (600) delivering the piece-goods (1) to the System. Reference B of the FIG. 29 illustrates the specific physical interface between the external system (5) and the System. Reference C of the FIG. 29 illustrates one embodiment of the internal conveyor system transferring the piece-goods from one position in the Piece-goods Buffer (404) to another. Reference D of the FIG. 29 illustrates one embodiment of Piece-goods Classification and Preparation Sub-system (601) of the System. Reference E of the FIG. 29 illustrates one embodiment of the Pre-palletizing Sub-system (602) of the Consolidation Process implemented by the Consolidation Station (410). Reference F of the FIG. 29 illustrates one embodiment of enabling piece-item recirculation and buffering within the Piece-goods Buffer (404) of the System. Reference G of the FIG. 29 illustrates one embodiment of the Consolidation Station (410) within which the group of piece-goods (10) is picked up by the Loading manipulator (9) at the base of the Consolidation Station (401). Reference H of the FIG. 29 illustrates one embodiment of the Loading manipulator (9). Reference I of the FIG. 29 illustrates one embodiment of the ULD Jig (502) that is able to manipulate an ULD (2) in synchrony with the Loading manipulator (9) while loading the group of piece-goods (10) into the ULD (2). Reference J of the FIG. 27, illustrates one embodiment of a ULD Jig (502) that enables exchange of the ULD (2) at the Operator Platform (603). Reference K of the FIG. 29 illustrates one embodiment of the System enabling ULD (2) logistics process between the System's Operator Platform (603) and what are known in the art as ULD trains.

While these embodiments have been described with emphasis on the particular example embodiments presented in FIGS. 1-29, it should be understood that within the scope of the appended claims, the embodiments might be practiced other than as specifically described herein.

REFERENCE SIGNS LIST

TABLE 1

Reference-number list

| No. | Component | No. | Component |
|---|---|---|---|
| 1 | piece-good | 100 | loading plan |
| 2 | air transport unit load device | 101 | ULD loading sequence |
| 3 | loading pallet | 102 | interest group of piece-goods |
| 4 | loading process | 103 | piece-good logistics information |

TABLE 1-continued

Reference-number list

| No. | Component | No. | Component |
|---|---|---|---|
| 5 | external system | 104 | ULD manifest information |
| 6 | air-transport vehicle | 300 | loading position and orientation of piece-goods |
| 7 | land-transport vehicle | 301 | loading position and orientation of ULD |
| 8 | loading jig | 400 | control station |
| 9 | loading manipulator | 401 | grouping station |
| 10 | group of piece-goods (also a "block" or "Consolidated piece-goods") | 402 | piece-good manipulator |
| 11 | enclosed group of piece-goods | 403 | ULD loading station |
| 12 | group of piece-goods on a loading pallet | 404 | piece-goods buffer |
| 13 | enclosed group of piece-goods on an integrated loading pallet | 405 | piece-goods store |
| 20 | contour of a piece-good | 406 | process-internal transport medium |
| 21 | contour of a group of piece-goods | 407 | ULD buffer |
| 22 | joint contour of piece-goods | 408 | ULD store |
| 23 | ULD contour | 409 | mobile end-user terminal |
| 30 | characteristics of a piece-good | 410 | consolidation station |
| 31 | characteristics of a group of piece-goods | 500 | consolidation mould |
| 32 | characteristics of an enclosed group of piece-goods | 501 | gripper |
| 33 | characteristics of a group of piece-goods on a loading pallet | 502 | ULD Jig |
| 34 | characteristics of an enclosed group of piece-goods on an integrated loading pallet | 503 | Quick-mount adaptor |
| 35 | characteristics of an air transport unit load device | 504 | wall element |
| 36 | characteristics of loading plan | 505 | wall adjustment element |
| 37 | characteristics of means of loading | 506 | ULD platform |
| 38 | characteristics of loading environment | 507 | side element |
| 39 | characteristics of manipulation | 508 | top element |
| 40 | monitoring and control sub-process | 509 | peg-and-hole mechanism |
| 41 | administrative sub-process | 600 | baggage sorter conveyor |
| 42 | database sub-process | 601 | piece-goods classification and preparation sub-system |
| 43 | internal communication sub-process | 602 | pre-palletizing sub-system |
| 44 | data acquisition sub-process | 603 | operator platform |
| 45 | external communication sub-process | | |

The invention claimed is:

1. A method of preparing a plurality of items for air transport, comprising:
consolidating a plurality of items into bundles, the consolidation comprising:
consolidating a first bundle comprising a first sub-plurality of the plurality of items to be loaded into the unit load device, which first bundle has a prismatic shape or a shape with a trapezoidal cross-section corresponding to a respective contour or part of the contour of a unit load device, and
consolidating a second sub-plurality of the plurality of items into a second bundle, which second bundle has another pre-defined shape, and
loading the bundles into the unit load device so as to populate the volume or part of the volume of the unit load device, wherein:
the loading of the first bundle populates a first sub-volume of the volume of the unit load device,
the loading of the second bundle populates a second sub-volume of the volume of the unit load device, and wherein
the first bundle is loaded before the second bundle to a sub-volume which is enclosed,
manipulating the unit load device during loading, wherein:
the first bundle is loaded in a first orientation of the unit load device, and wherein
the second bundle is loaded in a second orientation of the unit load device, which second orientation is different to the first orientation.

2. The method according to claim 1, wherein the shape or size or both the shape and the size of the first bundle is different to that of the second bundle.

3. The method according to claim 1, wherein the method comprises during or after said consolidation, tying the items of the bundle together so as to maintain the shape of the bundle.

4. The method according to claim 3, wherein said tying comprises applying to the bundle a tying device belonging to a group comprising:
wrapping,
bands,
nets,
ties,
glue,
hooks, and
any combination of the above.

5. The method according to claim 1, wherein the items are consolidated into a jig which defines the shape of the bundle.

6. The method according to claim 5, wherein the bundle is loaded into the unit load device using the jig.

7. The method according to claim 5, wherein:
the first bundle is consolidated or loaded or both consolidated and loaded using a first jig, and the second bundle is consolidated or loaded or both consolidated and loaded using a second jig, or the first bundle is consolidated or loaded or both consolidated and loaded using an adjustable jig in a first configuration, and the second bundle is consolidated or loaded or both consolidated and loaded using the adjustable jig in a second configuration.

8. The method according to claim 1, wherein the unit load device specifies or encloses an inner volume with a shape or contour, into which the bundle or bundles are loaded, and wherein in pre-load planning the inner volume of the unit load device is divided into sub-volumes, which are matched by the first and second bundle during loading.

9. The method according to claim 1, wherein said manipulation includes tilting of the unit load device.

10. The method according to claim 1, wherein the manipulation includes manipulation in two or more, particularly six, degrees of freedom.

11. The method according to claim 1, wherein when loading a first bundle to a sub-volume of the unit load device that is enclosed:

the unit load device is first manipulated such that said sub-volume is above the opposite end of the unit load device, the first bundle is then loaded to said sub-volume, the unit load device is then manipulated such that sub-volume containing the first bundle is below the opposite end of the unit load device to receive the second bundle thereon.

12. The method according to claim 11, wherein the first bundle or the second bundle is temporarily secured to the unit load device for manipulation of the unit load device by inserting a retainer into the unit load device.

13. A system for preparing a plurality of items for air transport, the system comprising:

a first jig or a first configuration of an adjustable jig for receiving a first sub-plurality of a plurality of items, which first jig or first configuration of an adjustable jig is configured to consolidate a first bundle of said first sub-plurality of items, which first bundle has a shape corresponding to the contour or part of the contour of a unit load device, which first jig or first configuration of an adjustable jig is configured to produce a prismatic shape or a shape with a trapezoidal cross-section, a second jig or second configuration of an adjustable jig which is configured to consolidate a second bundle from a second sub-plurality of the plurality of items, which second bundle has a different shape or size or both shape and size to the first bundle, and by a unit load device (ULD) jig which is configured to manipulate the load unit device during loading.

14. The system according to claim 13, wherein the jig is configured to load the bundle into the unit load device or wherein the system comprises a robot, particularly a multi-axis robot, with a gripper configured to grip the consolidated bundle produced by the jig or an external consolidation mold in place while and loading the bundle into the unit load device.

15. The system according to claim 13, wherein the unit load device (ULD) jig is configured to tilt the load unit device during loading.

16. The system according to claim 15, wherein the ULD jig is configured to:

provide three or more degrees of freedom or to freely rotate the unit load device 10 degrees or more, particularly 180 degrees or more or to provide three or more degrees of freedom and freely rotate the unit load device 10 degrees or more, particularly 180 degrees or more.

17. The system according to claim 15, wherein the robot and the ULD jig are synchronized with each other.

18. The system according to claim 13, wherein the system comprises a tying station which is configured to during or after the said consolidation tying the items of the bundle together so as to maintain the shape of the consolidated bundle.

19. The system according to claim 13, wherein the system is configured to perform a method comprising:

consolidating a plurality of items into bundles, the consolidation comprising consolidating a first bundle comprising a first sub-plurality of the plurality of items to be loaded into the unit load device, which first bundle has a prismatic shape or a shape with a trapezoidal cross-section corresponding to a respective contour or part of the contour of a unit load device, and consolidating a second sub-plurality of the plurality of items into a second bundle, which second bundle has another pre-defined shape, and loading the bundles into the unit load device so as to populate the volume or part of the volume of the unit load device, wherein:

the loading of the first bundle populates a first sub-volume of the volume of the unit load device, the loading of the second bundle populates a second sub-volume of the volume of the unit load device, and wherein the first bundle is loaded before the second bundle to a sub-volume which is enclosed, manipulating the unit load device during loading, wherein:

the first bundle is loaded in a first orientation of the unit load device, and wherein the second bundle is loaded in a second orientation of the unit load device, which second orientation is different to the first orientation.

\* \* \* \* \*